(12) United States Patent
Bartels

(10) Patent No.: US 11,667,115 B2
(45) Date of Patent: Jun. 6, 2023

(54) DIGITAL HALFTONING WITH SPIRAL DOTS

(71) Applicant: AGFA OFFSET BV, Mortsel (BE)

(72) Inventor: Rudolf Bartels, Mortsel (BE)

(73) Assignee: AGFA Offset BV, Mortsel (BE)

( * ) Notice: Subject to any disclaimer, the term of this patent is extended or adjusted under 35 U.S.C. 154(b) by 156 days.

(21) Appl. No.: 16/758,876

(22) PCT Filed: Oct. 23, 2018

(86) PCT No.: PCT/EP2018/079011
§ 371 (c)(1),
(2) Date: Apr. 24, 2020

(87) PCT Pub. No.: WO2019/081493
PCT Pub. Date: May 2, 2019

(65) Prior Publication Data
US 2021/0370661 A1  Dec. 2, 2021

(30) Foreign Application Priority Data

Oct. 27, 2017  (EP) ..................................... 17198925
Aug. 10, 2018  (EP) ..................................... 18188424

(51) Int. Cl.
*B41C 1/10* (2006.01)
*G06K 15/02* (2006.01)
(Continued)

(52) U.S. Cl.
CPC .............. *B41C 1/10* (2013.01); *B41M 5/0047* (2013.01); *B41N 1/14* (2013.01); *G06K 15/1836* (2013.01); *G06K 15/1881* (2013.01)

(58) Field of Classification Search
CPC .. H04N 1/4057; H04N 1/4056; H04N 1/4051; H04N 1/405
See application file for complete search history.

(56) References Cited

U.S. PATENT DOCUMENTS

| 5,155,599 | A  | 10/1992 | Delabastita  |
| 7,016,073 | B1 | 3/2006  | Meyer et al. |

(Continued)

FOREIGN PATENT DOCUMENTS

| DE | 32 28 387 A1 | 2/1983 |
| EP | 0 910 206 A1 | 4/1999 |

(Continued)

OTHER PUBLICATIONS

Official Communication issued in International Patent Application No. PCT/EP2018/079011, dated Feb. 12, 2019.
(Continued)

*Primary Examiner* — Jennifer Bahls
*Assistant Examiner* — Quang X Nguyen
(74) *Attorney, Agent, or Firm* — Leydig, Voit & Mayer, Ltd.

(57) ABSTRACT

A halftone raster image suitable for rendering a continuous-tone image includes a plurality of spiral dots. The spiral dots include image pixels arranged as a first arc or as a plurality of arcs which together represent a first spiral, and non-image pixels arranged as a second arc or as a plurality of arcs which together represent a second spiral. The spiral dots enable a controlled spreading of the ink within the dot, resulting in a higher image quality, ink saving, and faster drying.

34 Claims, 27 Drawing Sheets

(51) Int. Cl.
  *B41N 1/14* (2006.01)
  *B41M 5/00* (2006.01)

(56) References Cited

U.S. PATENT DOCUMENTS

| | | | |
|---|---|---|---|
| 2006/0096479 A1* | 5/2006 | McCrea | B41C 1/02 |
| | | | 101/401.1 |
| 2007/0002384 A1 | 1/2007 | Samworth et al. | |
| 2013/0194598 A1 | 8/2013 | Torii | |
| 2017/0272610 A1* | 9/2017 | Stevens | H04N 1/40087 |
| 2017/0326899 A1* | 11/2017 | Bartels | B42D 25/41 |
| 2018/0084151 A1* | 3/2018 | Lockwood | H04N 1/40087 |

FOREIGN PATENT DOCUMENTS

| | | |
|---|---|---|
| EP | 1 318 662 A2 | 6/2003 |
| EP | 1 428 666 A1 | 6/2004 |
| EP | 1 684 499 A2 | 7/2006 |
| EP | 1 742 801 A1 | 1/2007 |
| EP | 1 916 101 A2 | 4/2008 |
| JP | 2003-234900 A | 8/2003 |
| JP | 2005-26987 A | 1/2005 |
| JP | 2006-270927 A | 10/2006 |

OTHER PUBLICATIONS

"plugin for creating halftone/array of small objects to approximate an underlying object", https://community.adobe.com/#1265202, Dec. 25-27, 2006, pp. 1-11.

Pritchard, "The Print Guide: Creating Custom Halftone Dots", Jun. 10, 2009, pp. 1-6.

Japanese Patent Office, Office Action in Japanese Patent Application No. 2020-523745, 8 pp. (dated Apr. 28, 2021).

AGFA-Gevaert Group, "ColorDynamics masters the dot with SPIR@L screening and Energy Verve" (2022), 5 pp.

AGFA-Gevaert Group, "New York Daily News raises the bar on newspaper print production" (2022), 4 pp.

AGFA-Gevaert Group, "SPIR@L—The new quality standard in heatset printing" (2022), 4 pp.

AGFA-Gevaert Group, "SPIR@L screening exceeds expectations at Grupo Sinos" (2022), 2 pp.

AGFA-Gevaert Group, "Tribune Publishing Company gets better quality output with less ink, less water and less waste" (2022), 4 pp.

\* cited by examiner

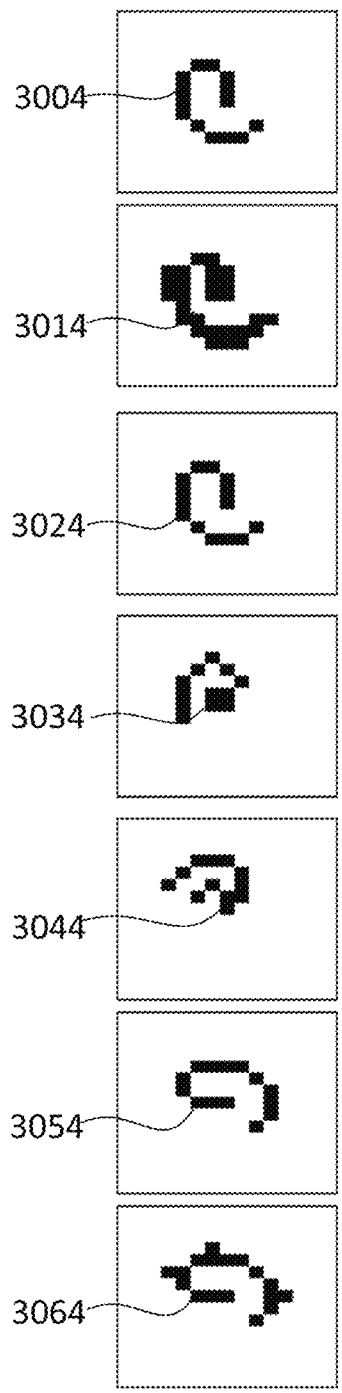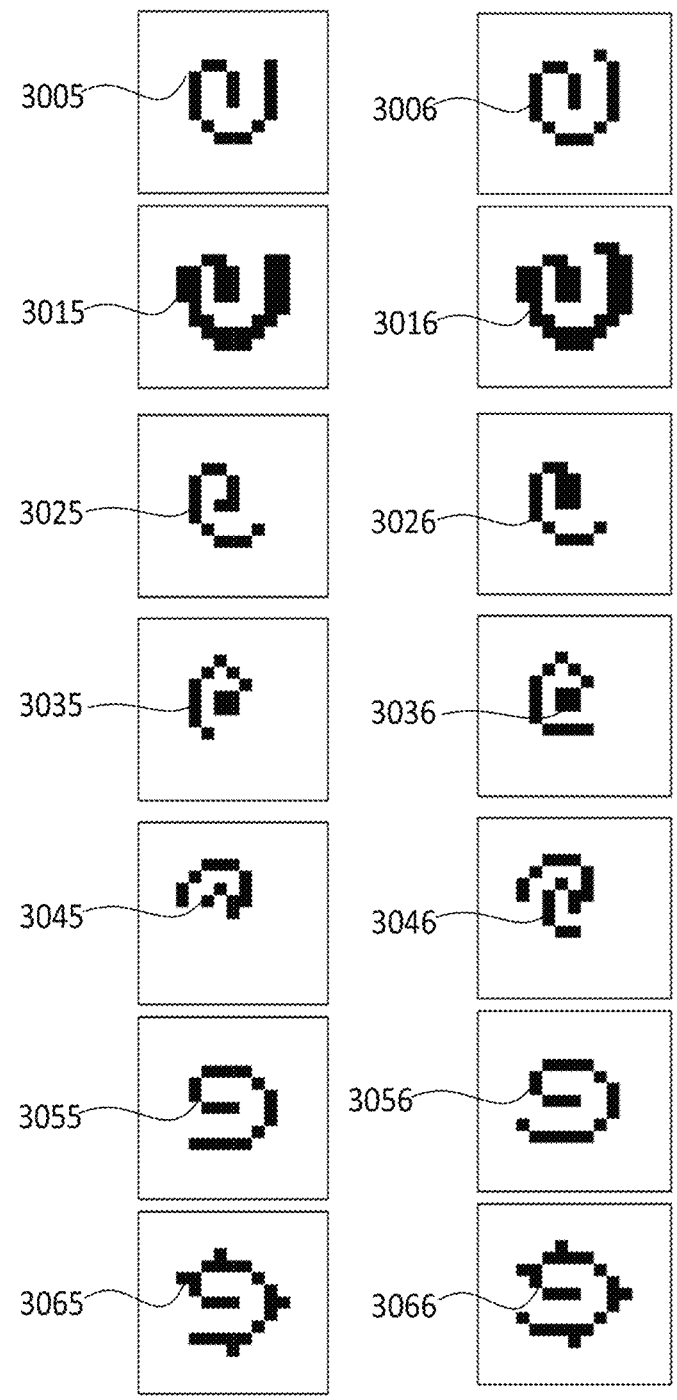
Fig. 29  Fig. 30  Fig. 31

DIGITAL HALFTONING WITH SPIRAL DOTS

CROSS REFERENCE TO RELATED APPLICATIONS

This application is a 371 National Stage Application of PCT/EP2018/079011, filed Oct. 23, 2018. This application claims the benefit of European Application No. 17198925.4, filed Oct. 27, 2017 and European Application No. 18188424.8 filed Aug. 10, 2018, each of which is incorporated by reference herein in its entirety.

BACKGROUND OF THE INVENTION

1. Field of the Invention

The invention relates to the field of digital halftoning methods used for printing images, in particular by means of lithographic or flexographic printing presses, and by digital printing techniques such as inkjet printing.

2. Description of the Related Art

Printing presses and digital printers cannot vary the amount of ink or toner that is applied to particular image areas except through digital halftoning, also called dithering or screening. Digital halftoning is the process of rendering the illusion of a continuous-tone image with a number of dots, also called halftone dots. The digital image produced by digital halftoning is called a halftone raster image or screen. Both multilevel and binary halftoning methods are known. The halftone dots produced by binary methods consist of pixels which represent image data and pixels which represent non-image data.

Binary digital halftoning is a well-known technique, which is explained in detail by Robert Ulichney in his book "Digital Halftoning", MIT Press, 1987, ISBN 0-262-21009-6, wherein chapter 5 about 'clustered-dot ordered dither' is background art for the present invention including the use of threshold tiles for rendering continuous-tone images.

Another overview of digital halftoning methods is disclosed in an article "Recent trends in digital halftoning", Proc. SPIE 2949, Imaging Sciences and Display Technologies, (7 Feb. 1997); doi: 10.1117/12.266335 wherein also multilevel digital halftoning is explained.

AM (amplitude modulated) screening is a widely used clustered-dot-ordered dithering technique wherein the size of the halftone dots is modulated in order to represent different densities of an image. When printing an AM image, each halftone dot corresponds to a certain amount of ink, called further a blob, which has to be pressed or jetted onto the substrate to be printed, dried and cured in a (very) short time, which may especially produce problems when printing with multiple inks on top of each other, whether wet-on-wet or wet-on-(semi)dry. The spreading of the ink on the substrate or previous lay down ink layers, which is determined by the thickness of the blob, and the local (de)wetting and/or absorption of the ink on the substrate, renders the printed blob locally uncontrollable, thereby producing noise in the printed image and substrate depended print quality.

Such problems can be addressed by other screening technologies such as FM (frequency modulated) screening or techniques involving error diffusion. In both these techniques, the image density of the halftone dots is modulated by the frequency of the dots instead of the dot size. However also these techniques are characterized by other issues like print stability, poor smoothness of flat tones, higher dot gain and higher wear of printing plates in long print runs.

Hybrid screening techniques are available which combine AM and FM methods so as to obtain the advantages of both. Said screening techniques however involve the use of multiple threshold tiles for rendering a continuous-tone image, which requires more memory space to store these multiple threshold tiles, for example a threshold tile with FM method in the highlights, a threshold tile with AM method in the midtones and another threshold tile with FM method in the shadows. In addition, the transitions from one threshold tile to another may produce density jumps in the printed image whereby calibration of said screening techniques also takes more service time than AM and FM.

US2007/0002384 discloses a method of controlling thickness of an ink blob in an AM halftone region of a printing plate or an intermediate image carrier on a digital press. The method generates a raster image with regularly tiled halftone dots, which comprise one or more ink-receptive rings enclosing a non-receptive portion. In other words, the ink-receptive rings form a closed loop, which completely encloses the portion that does not accept ink; as a result, the extent at which the ink can spread within the dot remains limited because no further spreading of the ink within the dot is possible as soon as the enclosed portion is filled.

SUMMARY OF THE INVENTION

So there is still a need for an alternative halftone image which allows a better control of the spreading of the printed ink blob, so that the image quality is less dependent on the nature of the substrate, and the image noise is low especially in highlights and mid-tones.

These problems are solved by the halftone raster image described below, wherein the halftone dots comprise, with reference to FIG. 36:

(i) image pixels arranged as a first arc (200) or as a plurality of arcs which together represent a first spiral (100), and (ii) non-image pixels arranged as a second arc (201) or as a plurality of arcs which together represent a second spiral (101).

Such dots will be referred to herein as "spiral dots". The image pixels are represented by the black areas in the figures. The non-image pixels define non-printing areas and correspond to the empty space that is left in the dot as represented by the white areas in the figures. The two dots at the left hand side of FIG. 36 have a low dot coverage (low percentage of image pixels) and represent highlights of an image, while the two dots at the right hand side of FIG. 36 have a high dot coverage and represent shadows of said image.

The image pixels define areas of the image which is to be printed, typically with ink, e.g. by a printing press or an inkjet printer, or with toner, e.g. in a laser printer. We will mainly refer herein to printing with ink, but the skilled person understands that the same reasoning equally applies to printing with other types of colorant such as toner or sublimation dye or applies to printing with varnish or white ink.

In the highlights of the image, the number of image pixels per dot is low so that they cannot form a complete winding of the first spiral but just a section thereof, which is referred to as the "first arc". The empty space which is partially enclosed by the first arc also may be considered as another arc, which is referred to herein as the "second arc". In the midtones and shadows of the image, the number of image pixels per dot is higher so that they can form one or more windings of the "first spiral", thereby also defining a "second spiral" of non-image pixels defined by the empty space between the windings of the first spiral (see e.g. FIG. 10).

Without being bound by theory, it can be observed upon magnification of the printed image that the shape and size of the printed ink blob is less affected by uncontrolled spreading of the ink because, when the ink blob is pressed onto the substrate, e.g. by a printing press, the excess ink that is printed by the first arc or first spiral can flow into the empty space that corresponds to the second arc or second spiral. The empty space defines an ink channel that can accept ink, which is printed from the first arc/spiral, thereby providing means for controlling the spreading of the ink.

Contrary to the halftone dots disclosed in US2007/0002384, wherein the empty rings are not connected to each other, the empty arcs used in the spiral dots of our invention can be connected to one another (thereby forming the second spiral), so that the ink blob has more room to spread within the dot. As a result, the raster image of the present invention produces well-shaped ink dots on the printed substrate, resulting in an improved quality of the reproduced images and less dot gain, which is especially advantageous when printing on absorbent, uncoated paper stock such as newsprint.

Due to said better ink spreading, our invention allows to obtain a good print quality with less ink consumption than conventional techniques because the excess ink that is sitting on top of a printed blob, when printed with a conventional raster image, contributes to the density of the printed image by filling the empty space formed by the second arc or the second spiral.

Moreover, the lower extent of local ink accumulation produces thinner ink drops on the printed substrate and therefor enables faster drying of the printed copies.

In a preferred embodiment of our invention, which is defined below, the second spiral is open-ended, i.e. not terminated by image pixels at the outer edge of the halftone dot, so that it forms an open channel that can guide excess ink out of the dot. Magnified images of printed dots produced by this embodiment, as shown in FIG. 25, typically show the release of a small quantity of ink at the outlet of the channel, i.e. outside the dot. The open channel enables a further spreading of the ink and, as a result, more ink saving and still faster drying.

Another advantage of the raster image of our invention is that it can be produced by a single threshold tile for the full range of density values per colour, such as cyan, magenta, yellow or black, so that it can be implemented without installing additional memory in current image processors, prepress workflow systems and raster image processors (RIP's), digital printers and plate setters.

The rendering of higher image densities in the highlights and mid-tones of the image can be realised simply by growing the length of the first spiral by adding more arcs to it, thereby producing more windings of the first spiral around the centre of the dot (and, as a result, also more windings of the second spiral). Higher image densities can also be obtained by increasing the thickness of the first spiral. Both embodiments can be combined in the same image, i.e. the image density of the halftone dot can be increased by growing the length and by increasing the thickness of the first spiral. In the shadows of the image, where the halftone dots touch or even overlap, higher image densities can be obtained by shrinking the length and/or thickness of the second spiral.

The halftone raster image of our invention is preferably used in lithographic and flexographic printing systems. The present invention also provides advantages when used in combination with digital printers, in particular inkjet systems. These and other applications and advantages of our invention are further described in the detailed description.

BRIEF DESCRIPTION OF THE DRAWINGS

FIG. 1 is an enlargement of a raster image according to the invention comprising Archimedean spiral dots which have a 50% dot coverage and which are tiled regularly in a square grid. FIG. 11 represents multiple dot coverages produced by the same threshold tile as in FIG. 1.

FIG. 2 is an enlargement of a raster image according to the invention comprising spiral dots which have a 50% dot coverage and an elliptical shape, and which are angled along the screen angle of the threshold tile. FIG. 12 represents multiple dot coverages produced by the same threshold tile as in FIG. 2.

FIG. 3 is an enlargement of a raster image according to the invention comprising Archimedean spiral dots which have a 50% dot coverage, and which are regularly tiled in a hexagonal grid. FIG. 13 represents multiple dot coverages produced by the same threshold tile as in FIG. 3.

FIG. 4 is an enlargement of a raster image according to the invention comprising spiral dots which have a 50% dot coverage and a square shape with rounded edges. FIG. 14 represents multiple dot coverages produced by the same threshold tile as in FIG. 4.

FIG. 5 is an enlargement of a raster image according to the invention comprising Archimedean spiral dots which have a 50% dot coverage, wherein the start angle of the rotation of the spirals is varied within the same image. FIG. 15 represents multiple dot coverages produced by the same threshold tile as in FIG. 5.

FIG. 6 is an enlargement of a raster image according to the invention comprising Archimedean spiral dots which have a 50% dot coverage and which comprise a radial line from the centre to the edge of the dot. FIG. 16 represents multiple dot coverages produced by the same threshold tile as in FIG. 6.

FIG. 4 is an enlargement of a raster image according to the invention comprising spiral dots which have a 50% dot coverage and a square shape without rounded edges. FIG. 17 represents multiple dot coverages produced by the same threshold tile as in FIG. 7.

FIG. 8 is an enlargement of a raster image according to the invention comprising Archimedean spiral dots which have a 50% dot coverage and which were generated with different parameters compared to the spirals in FIG. 1. FIG. 18 represents multiple dot coverages produced by the same threshold tile as in FIG. 8.

FIG. 9 is an enlargement of a raster image according to the invention comprising (i) Archimedean spiral dots which have a 50% dot coverage and (ii) a clustered dot in between the spiral dots. FIG. 19 represents multiple dot coverages produced by the same threshold tile as in FIG. 9.

FIG. 20 and FIG. 21: FIG. 20 shows an example of a threshold tile comprising threshold values from 1 to 256 which can be used to generate an image according to the invention. FIG. 21 shows the spiral dot that is generated by the threshold tile of FIG. 20 for a halftone dot having a threshold value of 22, which corresponds to a dot coverage of 8.6% (=22/256).

FIGS. 26-35: These figures represent the spiral dots which are generated by the threshold tiles of FIGS. 22-24. The dots are numbered with the same number as the threshold tile extended with the threshold value. For example dot "3025" is the spiral dot generated by threshold tile 302 and threshold value 5; likewise, dot "3017" is the spiral dot generated by threshold tile 301 and threshold value 7, etc.

DETAILED DESCRIPTION OF THE PREFERRED EMBODIMENTS

Definitions

Figure 1:
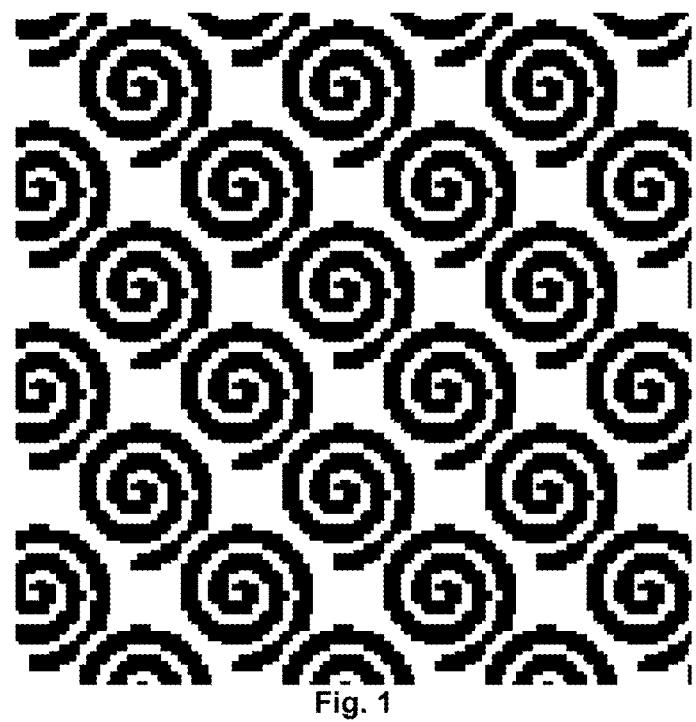
FIG. 1 and FIG. 11.

A halftone dot is a picture element of a screen, and can be e.g. circular-, elliptical-, diamond- or square-shaped. In the highlights and midtones of the image, the halftone dots are isolated from one another, while above a coverage of approximately 50% the dots connect with each other.

A screen, also called halftone raster image, is an area broken down into printing and non-printing picture elements (halftone dots or lines) wherein the size and/or number of dots per area varies according to the tone values (also called density) of the original such as a continuous-tone image.

Screening, also called halftoning, is the method whereby a continuous-tone image is transformed into a halftone raster image or a set of halftone raster images. The transformation may involve the use of one or more threshold tiles. The number of threshold tiles depends normally on the number of colour channels comprised in the continuous-tone image.

A continuous-tone (digital) image is defined by various image formats, also called raster graphics format, of which non-limiting examples are Portable Network Graphics (PNG), Tagged Image File Format (TIFF), Adobe Photoshop Document (PSD), Joint Photographic Experts Group (JPEG) and bitmap (BMP). A continuous-tone image typically has a large colour depth, such as 8-bit grayscale or 48-bit colour.

Screen frequency, sometimes called screen definition or screen ruling, is the number of halftone dots and screen lines per unit length in the direction that yields the greatest value. It is measured in lines per cm or lines per inch (LPI). Low-frequency screens give a coarse appearance whereas high-frequency screens gives a fine and smooth appearance.

RIP is the abbreviation of raster image processor. A RIP converts the information of a page (containing images, text, graphic elements and positional commands) to a halftone raster image, which may be sent to an output device, such as an image setter, plate setter or digital printer. The RIP may also be included in the output device.

Resolution, also called addressability, is the number of image elements (dots, pixels) per unit length that can be reproduced by an output device such as a monitor, printing plate or on paper. Normally expressed in units (dots) per cm or inch (dpi). High resolution means good rendering of detail. Output devices with a high resolution allow to use a high screen frequency.

Raster Image

The raster image of the present invention is suitable for rendering a continuous-tone image, i.e. it creates the illusion of a continuous-tone image on a printed copy. This requirement implies that the screen frequency is above 40 lines per inch (LPI; 15.7 lines/cm), more preferably above 60 LPI (23.6 lines/cm) and most preferably above 100 LPI (39.4 lines/cm). If the screen frequency is below 40 LPI, the dots become visible at viewing distance, also called reading distance, which is about 20 cm. Such low screen frequencies are typically used in artistic screening, which is used for decorative purposes such as patterned illustrations, wherein it is intended that the individual dots are visible to the naked eye. Raster images wherein the dots are clearly visible at viewing distance are therefore not an embodiment of the present invention.

Figure 11:
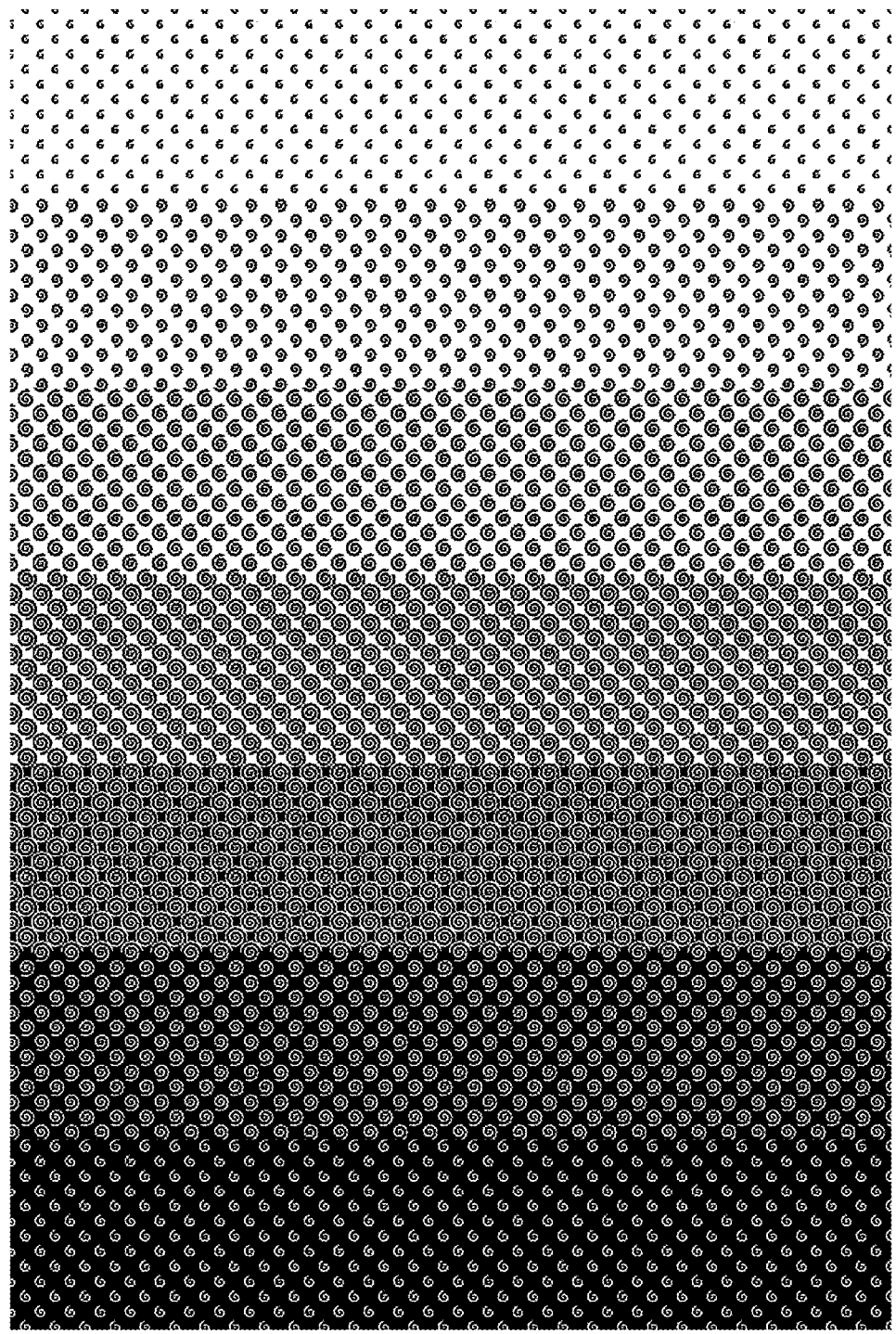
Figure 13:
Figure 14:
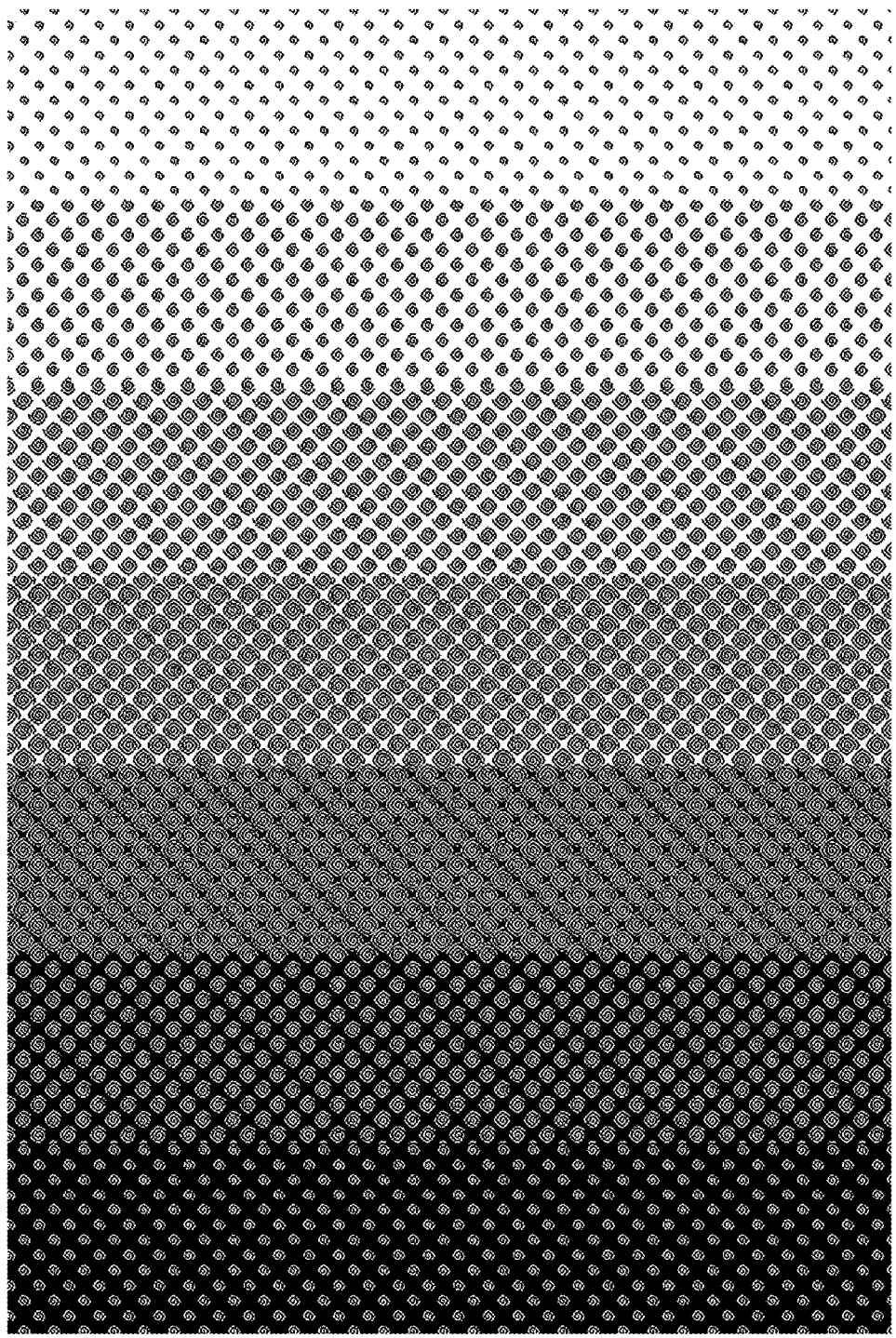

The raster image of the present invention comprises spiral dots which are preferably regularly tiled, e.g. tiled along a triangular, rectangular or hexagonal grid (e.g. FIG. 3 and FIG. 13) and preferably tiled along a square grid (e.g. FIGS. 1 and 11). The spiral dots may also be used in (semi)-random arranged halftone dots, such as blue noise or white noise arranged halftone dots. However regularly tiled spiral dots are preferred in order to avoid irregular structures in the printed images. The distance between the centres of neighbouring dots may range from 50 μm to 400 μm.

Figure 9:
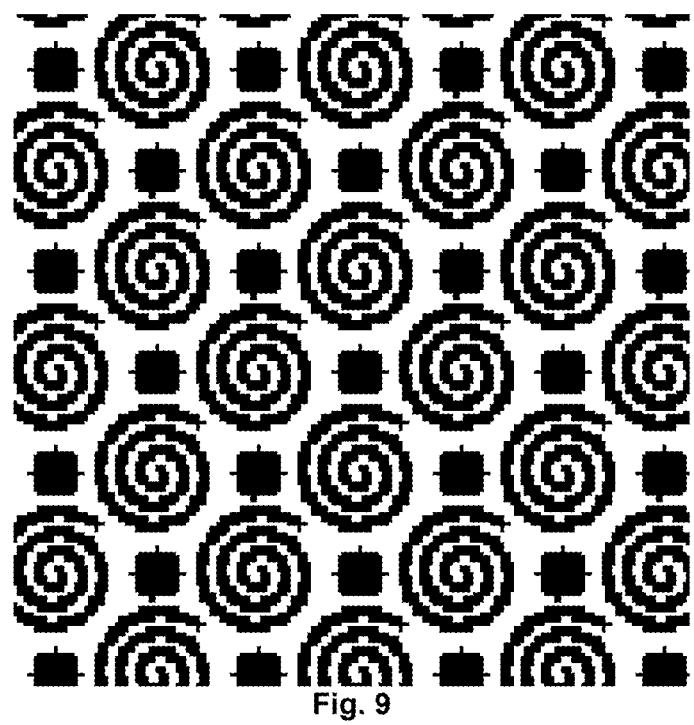
FIG. 9 and FIG. 19.
Figure 10:
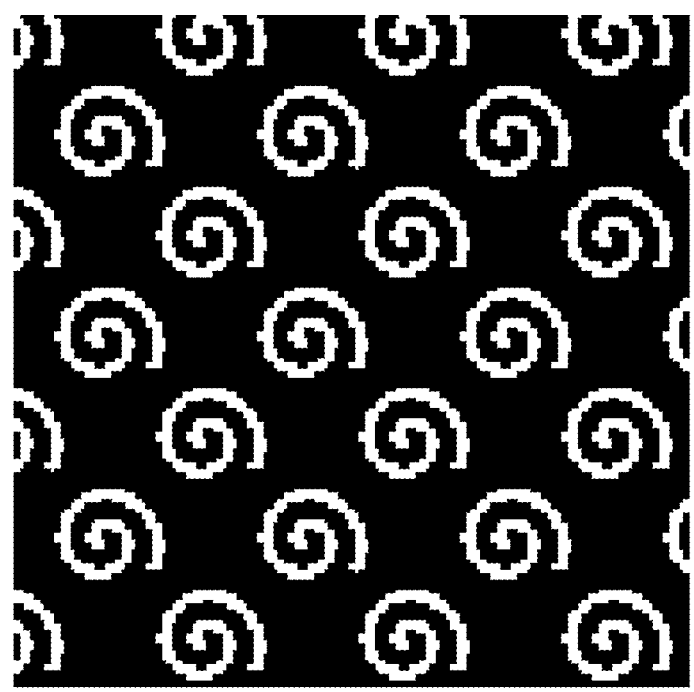
FIG. 10 is an enlargement of a raster image according to the invention comprising Archimedean spiral dots having a 90% dot coverage.
Figure 19:
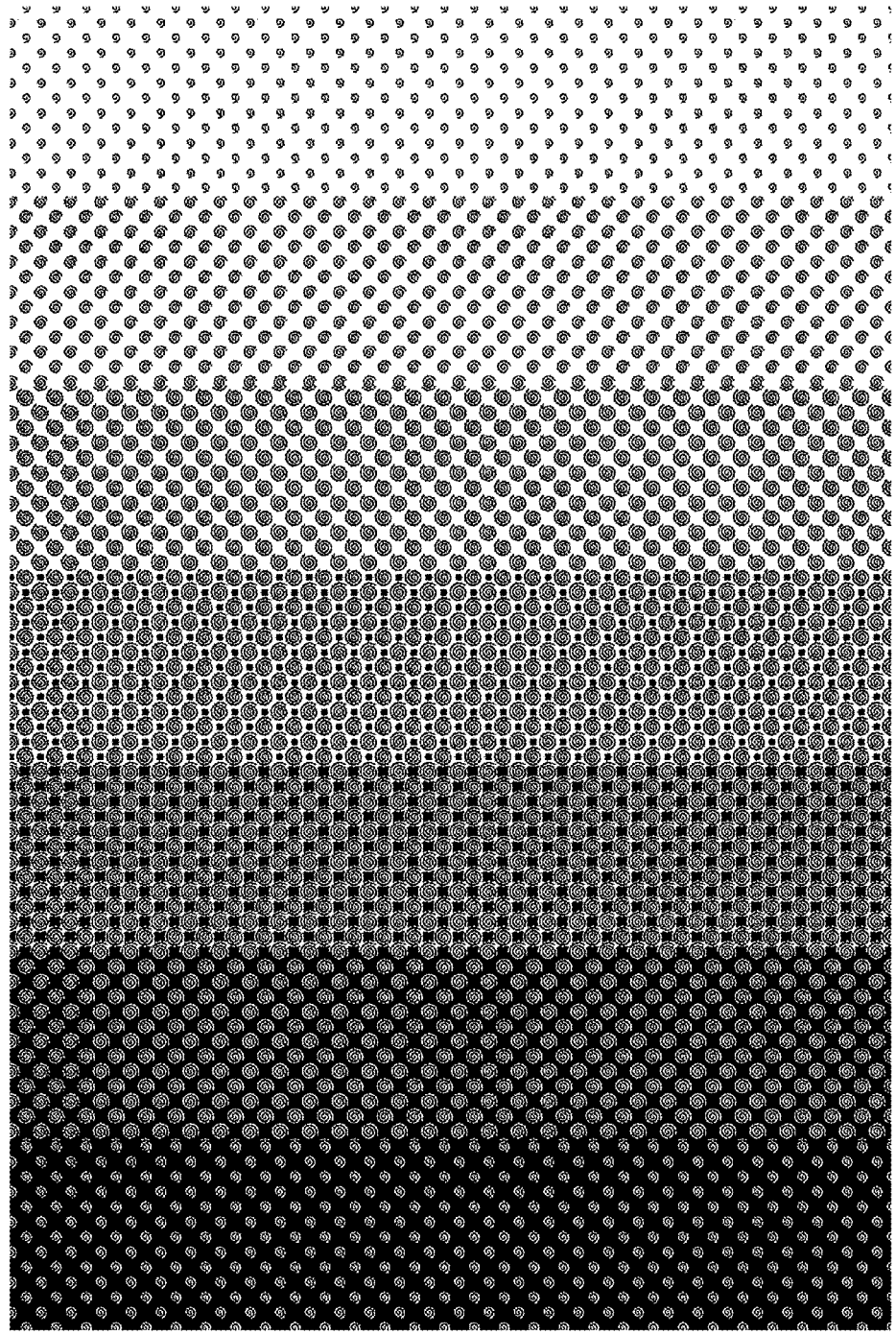

The raster image may further comprise conventional halftone dots, such as AM dots and/or FM dots, in combination with the spiral dots of the present invention (see e.g. FIGS. 9 and 19). In a more preferred embodiment, the raster image consists entirely of spiral dots according to the invention.

The screen angle of the raster image according to the present invention is preferably selected from the group consisting of 0°+k×30°, 7.5°+k×30°, 15°+k×30°, 22.5°+k×30° wherein k is a negative or positive integer. The most preferred embodiments have a screen angle selected from the group consisting of 0°, 15°, 75°, 90°, 45°, 67.5°, 22.5°, 7.5°, 82.5° and 37.5°. The screen angles are measured as conventionally defined in the printing industry, i.e. counter-clockwise from the horizontal axis to agree with the Cartesian coordinate system. When multiple raster images are combined in multi-colour printing, the screen angle difference between the colour selections is preferably a multiplier of 15° or a multiplier of 30°.

Spiral Dots

Preferably the spiral dots in the image of the present invention comprise only one "first arc" or one "first spiral", i.e. all the image pixels together form a single arc or a single spiral which may have a number of windings. However, also raster images with halftone dots wherein the image pixels are arranged into more than one arc or more than one spiral are embodiments of the present invention. In such embodiments, multiple arcs or spirals representing image pixels may be mutually connected at a common centre, as shown e.g. in FIGS. 31-35 (3046-3049 and 30410). Therefore, when we refer herein to the "first arc" or the "first spiral" (singular), it should be clear that halftone dots with multiple first arcs or spirals are also embraced by the present invention (304). The same remark applies to the second arc and the second spiral.

A spiral may be regarded as a combination of a plurality of arcs. An arc is a curved line which does not form a closed loop and typically corresponds to a segment of e.g. a circle or an ellipse, but also less conventional shapes are embraced by the term in the context of the present invention, e.g. segments of an optionally rounded rectangle or an optionally rounded triangle.

In a preferred embodiment, the centre of the first arc or spiral may be a point (a single image or non-image pixel) but it can also be a clustered halftone dot similar to AM dots of the prior art. The central dot may have any shape, such as a circle or a square (see e.g. FIG. 29-35: 3014-3019; 30110; 3026-3029; 30210; 3032-3039; 30310). The central dot may be larger in halftone dots which represent high image densities and smaller in halftone dots which represent low image densities.

Figure 39:
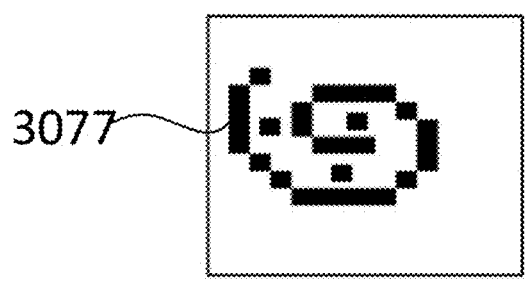
FIG. 39: This figure represents a spiral dot (3077) from a raster image according to the invention.

All the arcs which together constitute the first spiral are preferably mutually connected so that the first spiral represents a continuous line. The first spiral may also contain isolated non-image pixels or may comprise disconnected arcs, so that the first spiral is interrupted by empty space at one or more locations, as shown in FIG. 39. In that embodiment, the empty space which separates adjacent arcs of the first spiral may be regarded as protrusions of the second spiral into the first spiral. Such protrusions of the second spiral may cut the first spiral completely into disconnected arcs, or incompletely whereby the first spiral is not interrupted but reduced locally to a lower thickness.

The second spiral represents the non-image pixels of the raster image of our invention, i.e. the empty space between the arcs of the first spiral(s). In one embodiment of the invention, the space between adjacent windings of the first spiral is completely empty, i.e. does not contain any image pixel. In such embodiment, the empty space forms a continuous second spiral. In another embodiment of the invention, the first spiral comprises protrusions of image pixels which extend into the empty space between the windings as shown in FIGS. 28-35 (3063-3069 and 30610); such protrusions may connect two adjacent windings of the first spiral, thereby dividing the second spiral into two or more segments which are separated from one another by the mentioned protrusions of the first spiral. Other embodiments of the second arc or the second spiral may comprise isolated image pixels, i.e. image pixels which do not touch the first spiral, in the empty space between adjacent windings of the first spiral.

Figure 6:
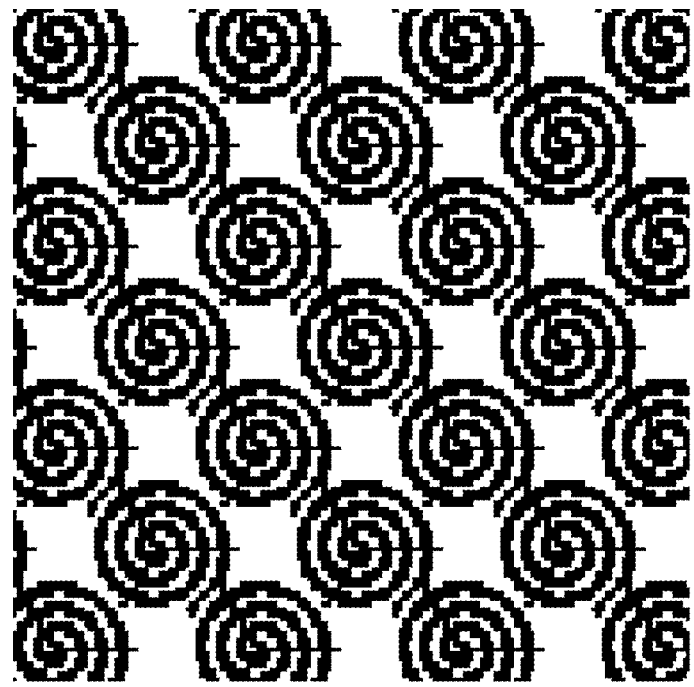
FIG. 6 and FIG. 16.
Figure 7:
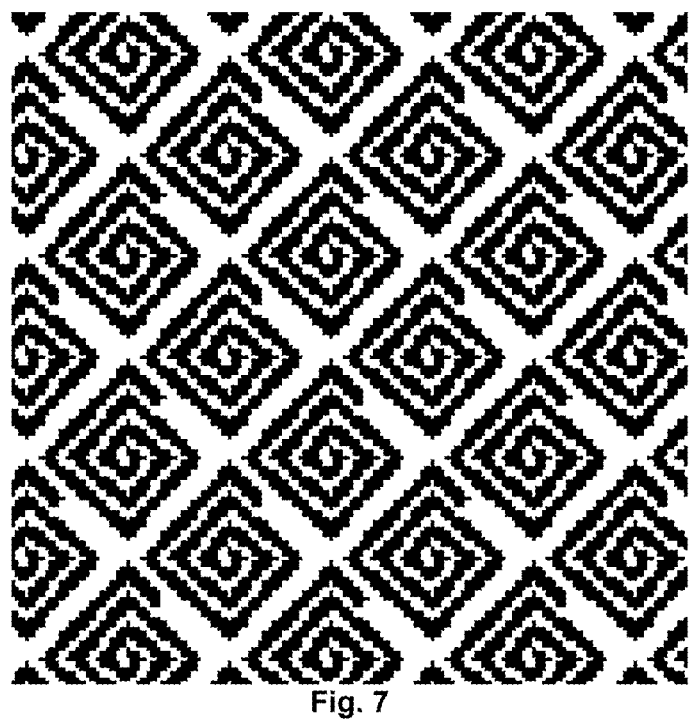
FIG. 7 and FIG. 17.
Figure 16:
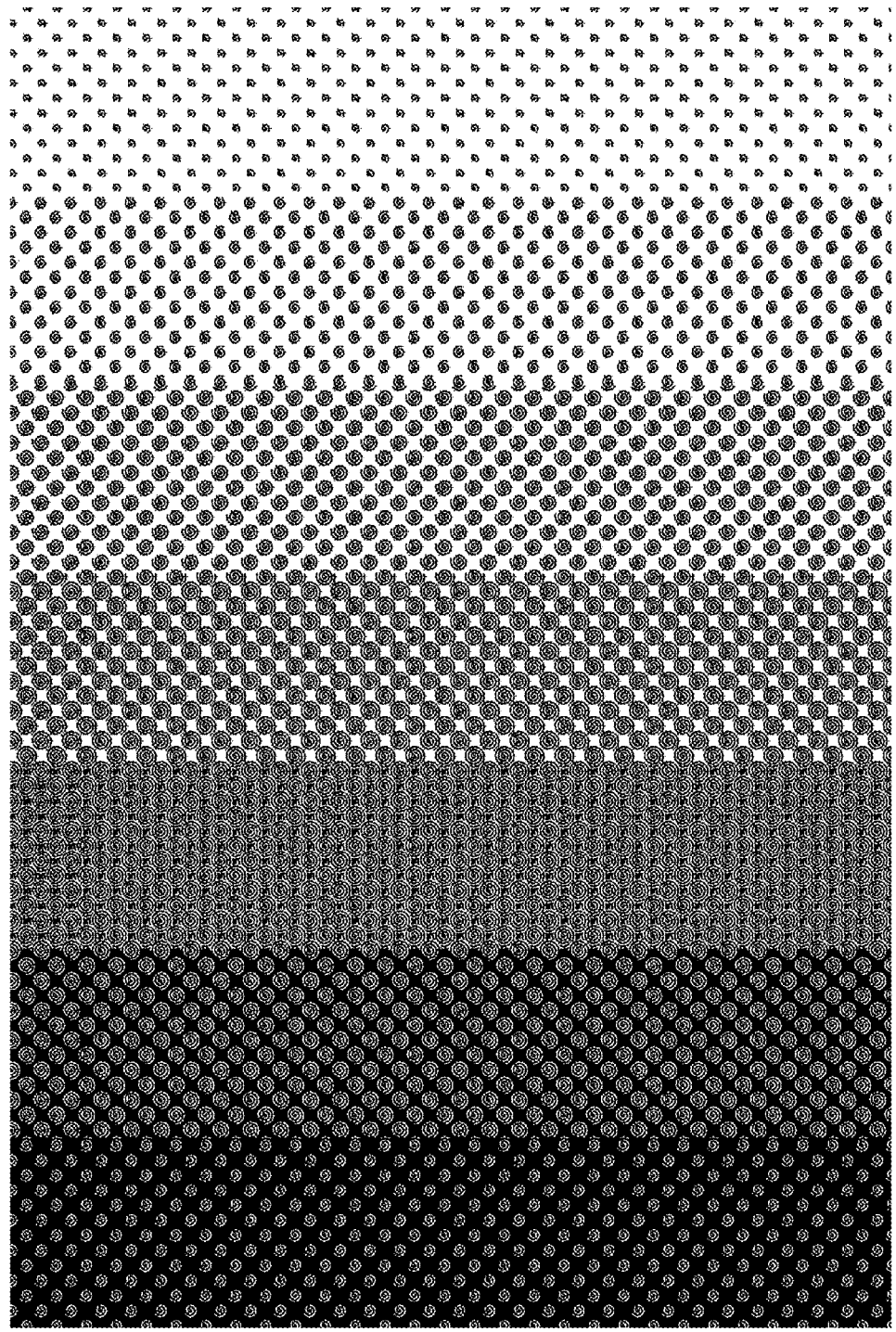
Figure 17:
Figure 18:
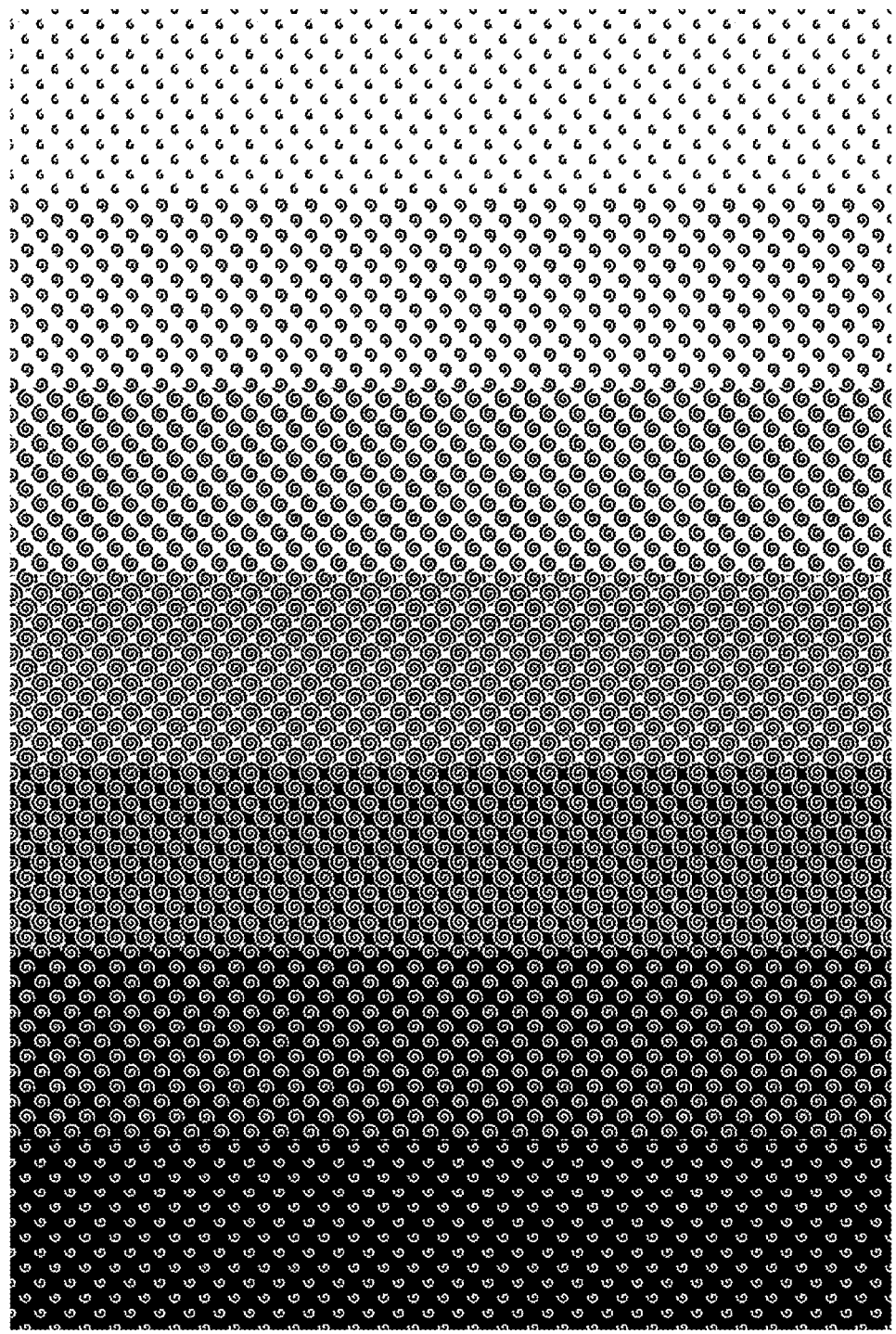

The protrusions of the first arc or the first spiral may align so as to form one or more radial lines in the spiral dot (FIG. 6 and FIG. 16). The thickness of such a radial line may be e.g. from one pixel to five pixels. For high screen frequencies, e.g. above 150 LPI (59 lines/cm), the thickness of said radial line(s) may be one or two pixels. The radial line may connect the centre of the spiral dot to the outer edge of the spiral dot, or may connect just two or more windings of the first spiral without making contact with the centre or the outer edge. The angle of a radial line may depend on the screen angle and/or start angle of the spiral.

In a highly preferred embodiment of our invention, the second arc or second spiral is open-ended, i.e. not terminated by image pixels at the outer edge of the halftone dot, so that it forms an open channel that guides excess ink out of the dot in a controlled way. In embodiments without such open channel, the higher ink accumulation may lead to uncontrolled ink splashes outside the outer edge of the dot, thereby producing irregularly shaped ink dots on the printed copies, resulting in a lower image quality.

In a preferred embodiment, the thickness of the first and second arc and of the first and second spiral is independently from 1 to 10 pixels, more preferably from 2 to 5 pixels, which preferably corresponds to a thickness from 1 µm to 75 µm.

The selection of the minimum thickness of the arc and spiral may be based on the resolution of the printing technique for which the raster image is intended. The maximum thickness, which enables the controlled ink spreading referred to above, may be determined by the specific type of substrate on which the halftone raster image shall be printed and/or may be determined by the desired screen frequency. These and other selections, such as start angle, are preferably made in an input field of a user interface of a halftone generator.

It shall be clear to the skilled person that the same dot coverage can be produced with different spiral dots of the same overall size: a dot consisting of just one winding of a first spiral of a certain thickness produces the same coverage as a dot with more windings of a first spiral of a lower thickness.

Figure 32:
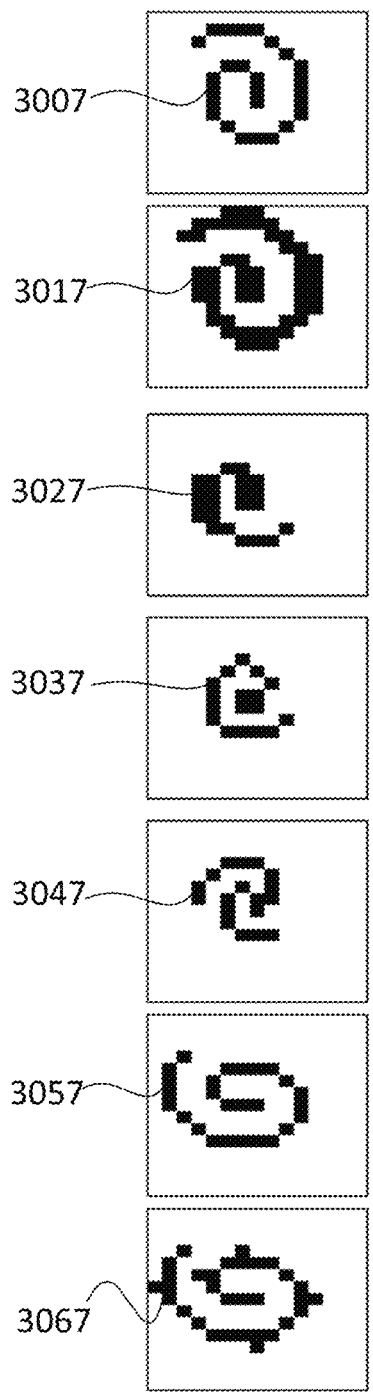
Figure 33:
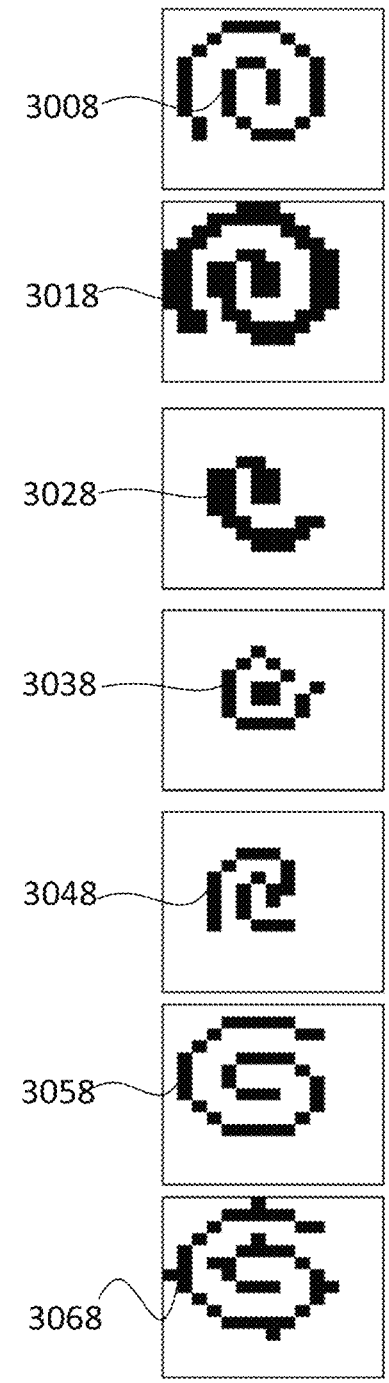
Figure 34:
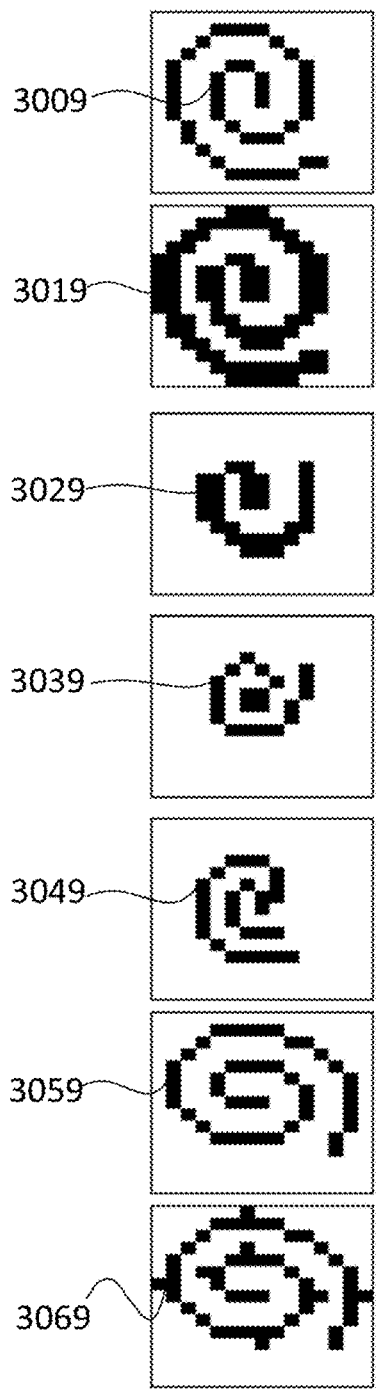
Figure 35:
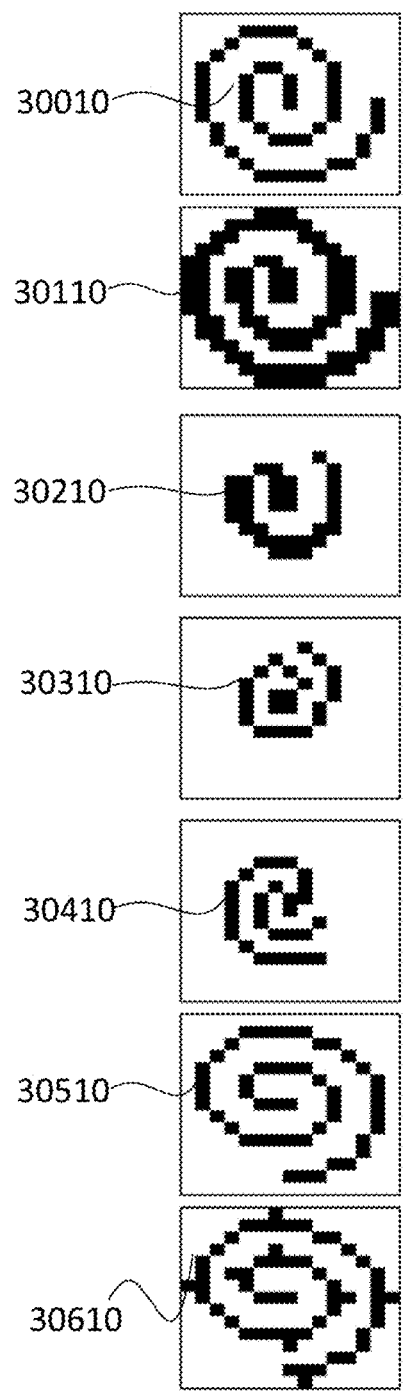
Figure 36:
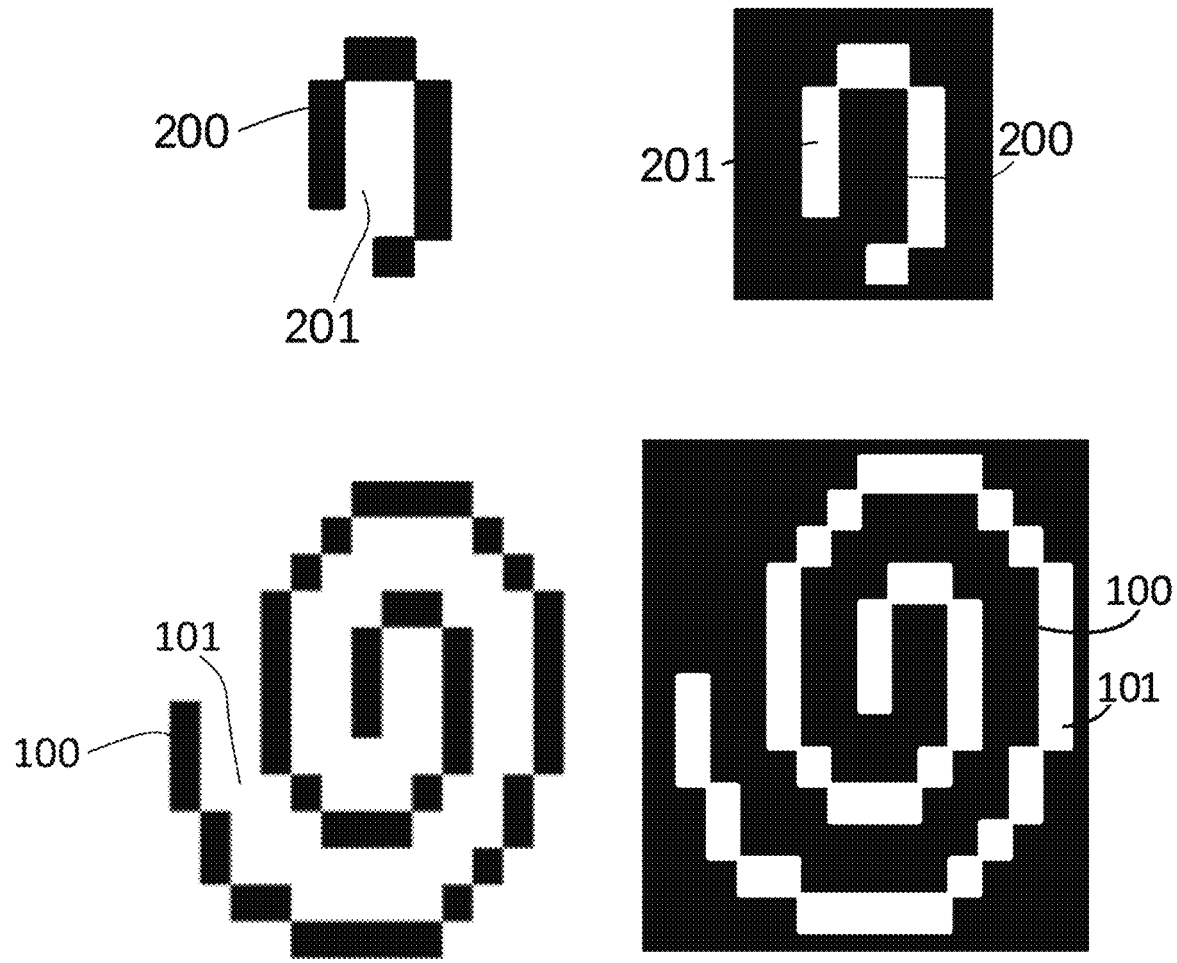
FIG. 36 shows four spiral dots according to the invention which comprise (i) image pixels arranged as a first arc (200) or as a plurality of arcs which together represent a first, clockwise rotating spiral (100), and (ii) non-image pixels arranged as a second arc (201) or as a plurality of arcs which together represent a second, clockwise rotating spiral (101).

The thickness of the first arc or first spiral may also vary within the same dot, e.g. smaller at the centre than at the edge of the dot, see e.g. FIGS. 32 (3027) and 33 (3028). Such a spiral dot may produce less graininess, especially in the mid-tones of the image.

The winding of the arcs and spirals used in the present invention may be clockwise or counterclockwise, and both these embodiments can be combined in the same raster image. FIGS. 1-10 represent spiral dots with clockwise windings. Examples of counterclockwise windings are shown in e.g. FIG. 29-35 (3004-3010; 3014-19; 30110; 3024-29; 30210; 3034-3039; 30310).

Figure 5:
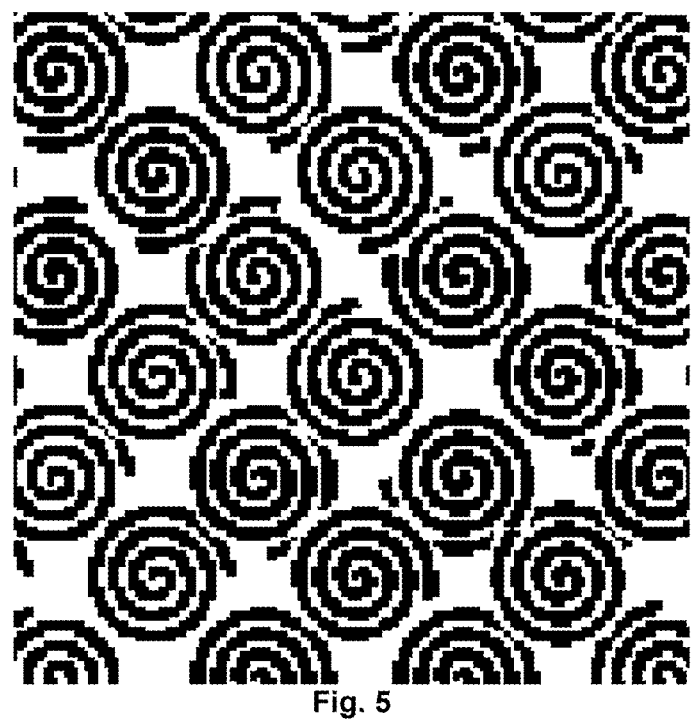
FIG. 5 and FIG. 15.
Figure 15:
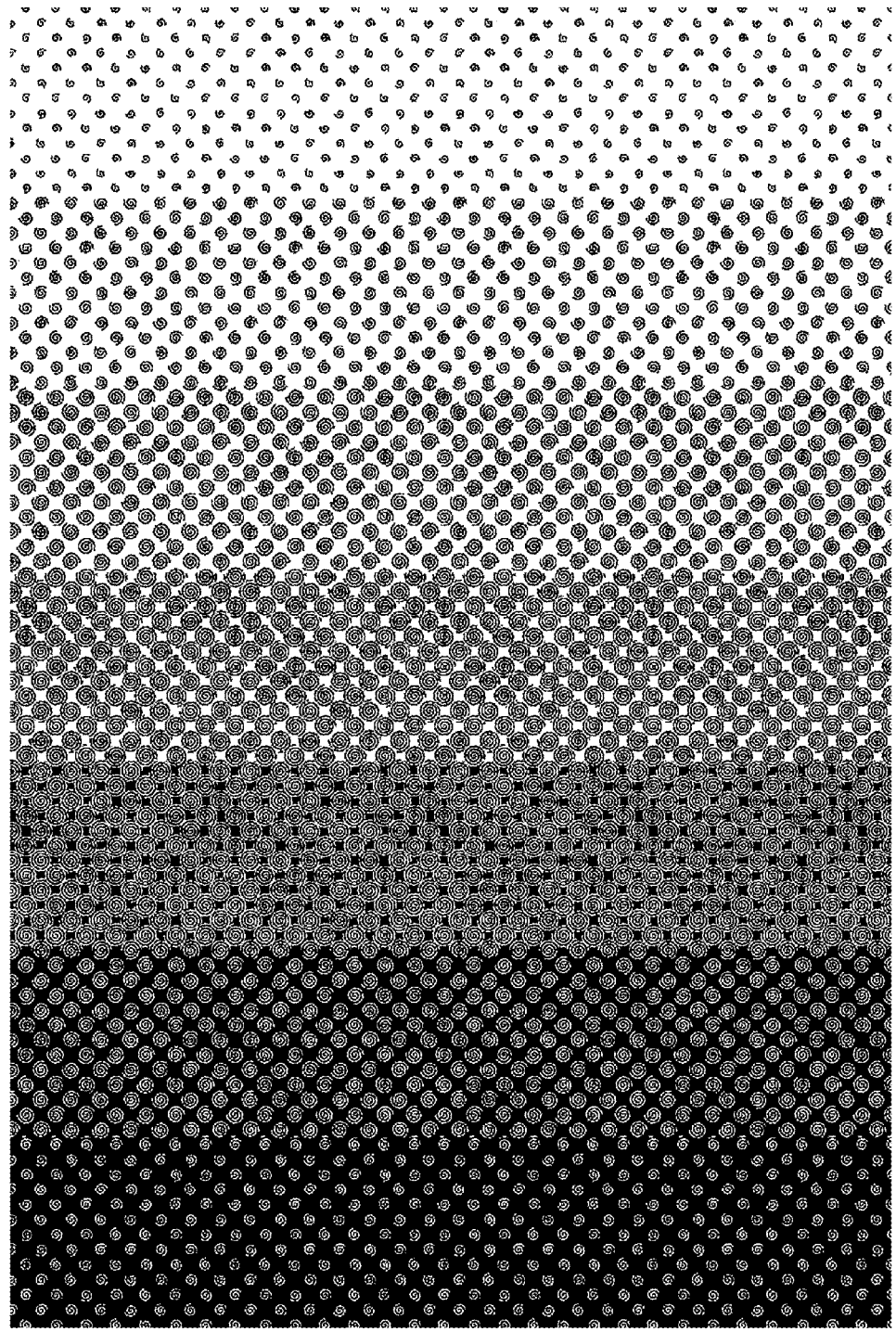

The start angle of the first arc or first spiral, at the centre of the dot, is preferably the same for all spiral dots in the image. In alternative embodiments of the invention, the start angle of each spiral dot is chosen randomly by a random number generator (FIG. 5. and FIG. 15). This is a less preferred embodiment because the dots may touch each other in an irregular way which may result in noisiness.

Figure 4:
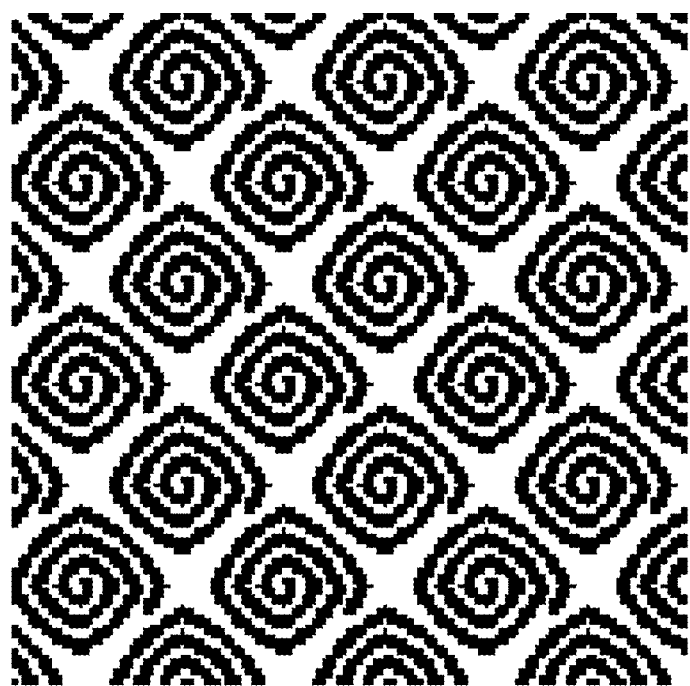
FIG. 4 and FIG. 14.

The shape of the first arc or first spiral may be of any type and different types of arcs and spirals can be combined within the same raster image (see e.g. the spiral dots of FIG. 4 having a square shape with rounded edges, while the spiral dots of FIG. 4 have a square shape without rounded edges).

Figure 3:
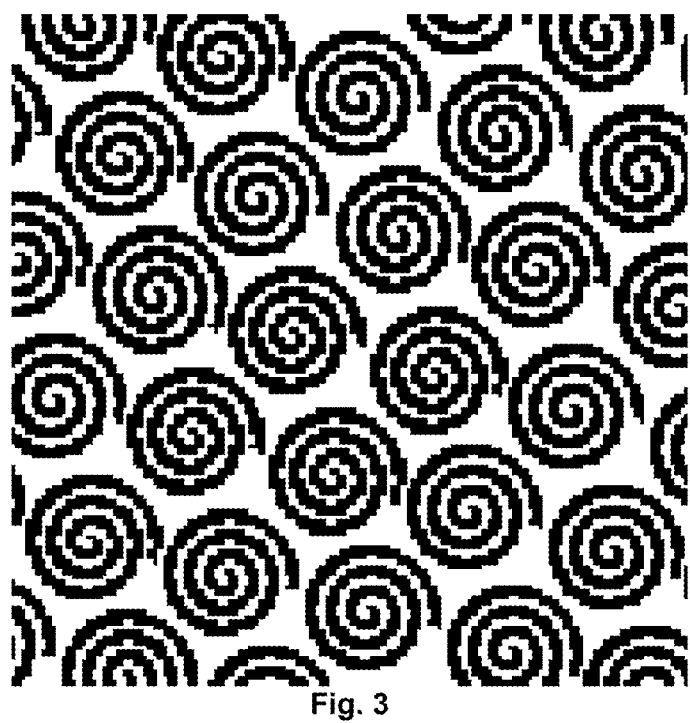
FIG. 3 and FIG. 13.
Figure 8:
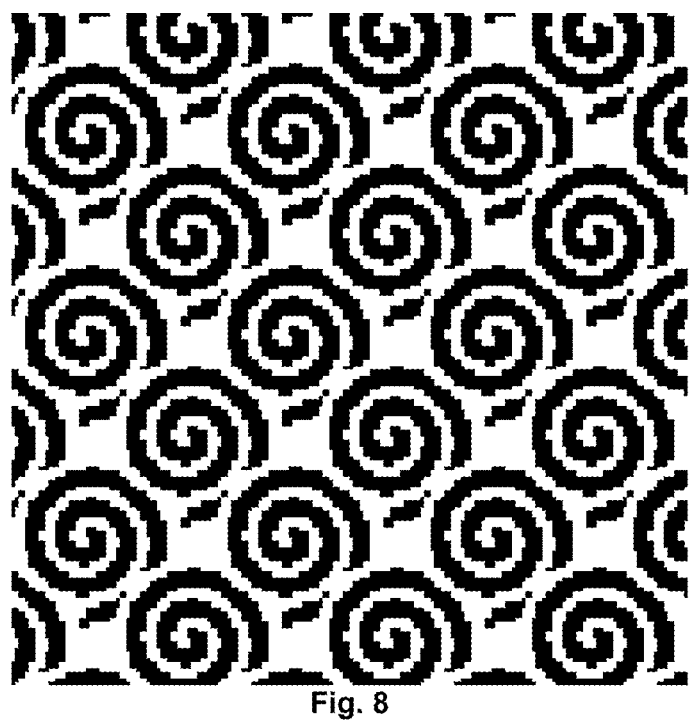
FIG. 8 and FIG. 18.

In a preferred embodiment, the first spiral is Archimedean, as defined by the formula $$r = a + b \times \theta$$

wherein r is the radial distance, θ is the polar angle and a and b are parameters which define the opening of the spiral at its centre and the distance between adjacent windings. The definition can even be more extended by the formula $$r = a + b \times \theta^{(1/n)}$$

wherein n is a constant which determines how tightly the spiral is wrapped. FIGS. 1, 3 and 8 represent Archimedean spirals with different parameters a and b.

In other embodiments, the first spiral may also be a circle involute, part of an Euler spiral, part of a logarithmic spiral, or a Fermat's spiral. Other types of spirals may be generated with a Gielis super formula, of which the following are suitable examples:

$$\rho = \rho(\varphi) = R(\varphi) \cdot \left( \left| \frac{\cos\left(\frac{m \cdot \varphi}{4}\right)}{a} \right|^{p_2} + \left| \frac{\sin\left(\frac{m \cdot \varphi}{4}\right)}{b} \right|^{p_3} \right)^{\frac{1}{p_1}}$$

Example 1

$a = b = 1 m = 10$ $p_2 = p_3 = 5 p_1 = 8$ $0 \leq \varphi \leq 14 \cdot 2\pi$ $R(\varphi) = \varphi^{235}$ Example 2

Figure 2:
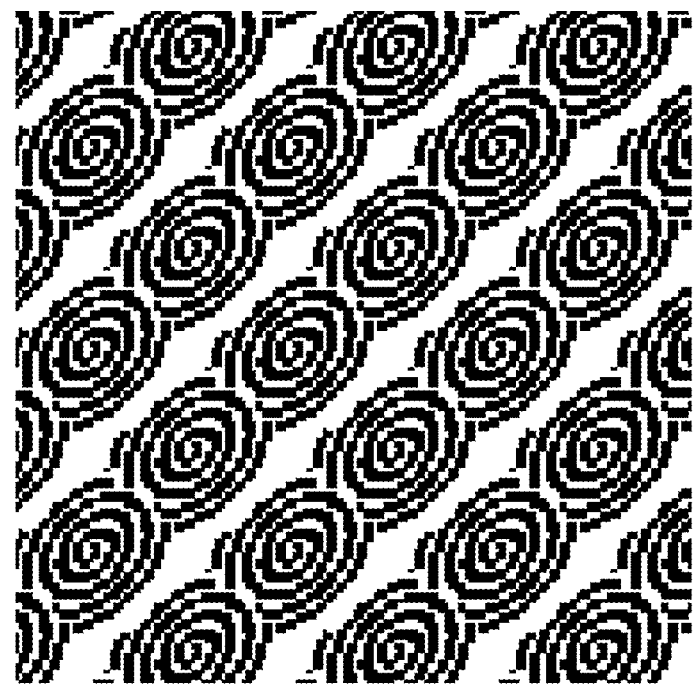
FIG. 2 and FIG. 12.
Figure 12:
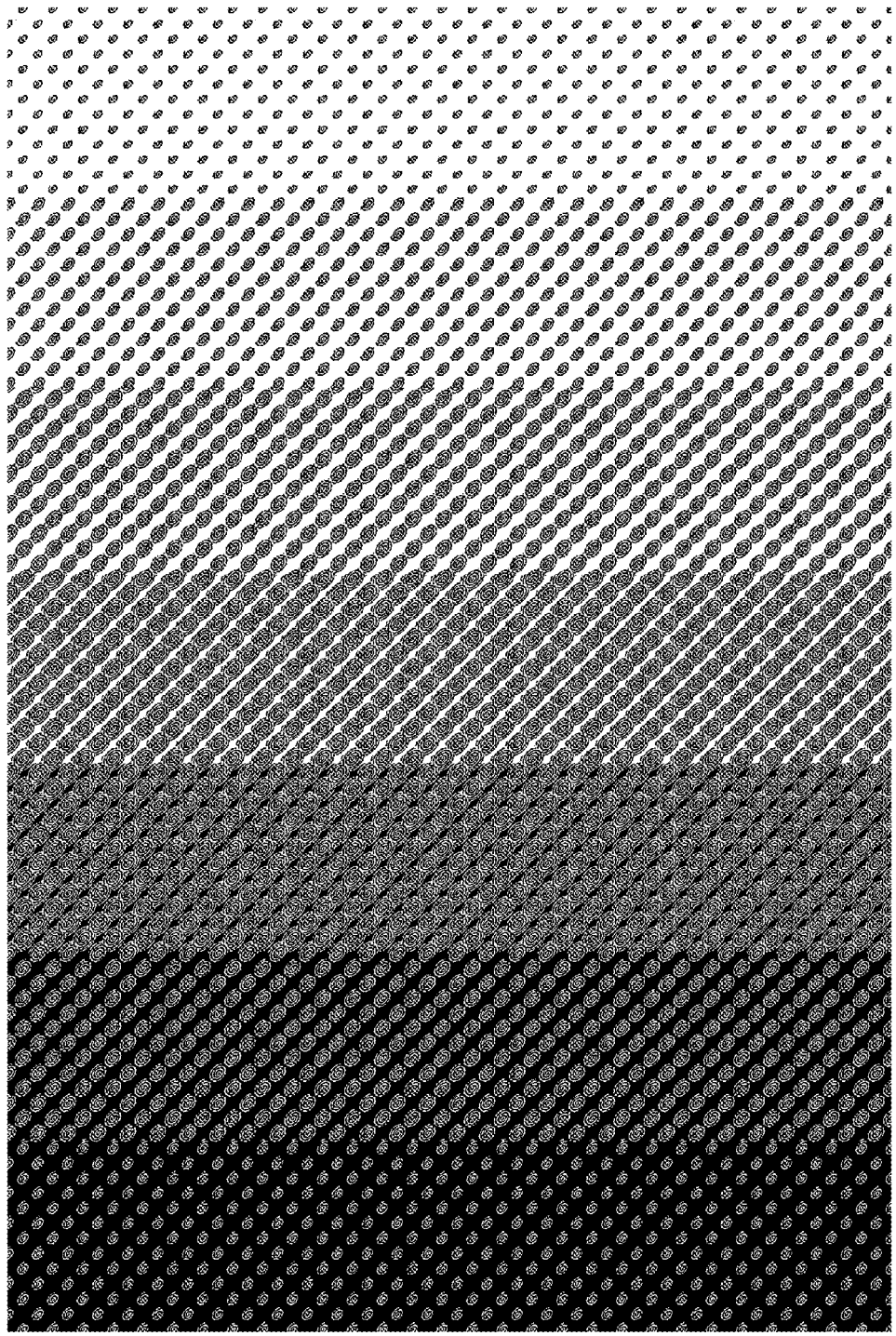

$a = b = 1 \; m = 6$ $p_2 = 0 p = p_1 = 100$ $0 \leq \varphi \leq 14 \cdot 2\pi$ $R(\varphi) = \varphi^{24}$ The first spiral may also be an elliptical spiral (FIGS. 2 and 12). In such embodiment, the major axis of the ellipse is preferably oriented along the screen angle or perpendicular to the screen angle of the raster image.

As already indicated in the Summary of the Invention, the ink channel which is defined by the second arc or second spiral allows controlled spreading of the ink that is printed at areas defined by the first arc or first spiral, thereby enabling to obtain a higher image quality with less ink than in the state of the art. In addition, the controlled spreading of the ink also allows to reduce print mottle. In the prior art, print mottle is reduced by modification of the surface of the substrate, e.g. by applying an ink absorbing coating or by corona treatment or flame treatment before printing. The present invention allows to avoid such modification for some substrates. In addition, it also provides a better water absorption of the paper so that water interference mottle is reduced. It may even reduce shine-through, also called print-through, in absorbent substrates, whereby images become visible at the backside of the substrate.

The present invention also allows to reduce moiré, which is known in the prior art to occur when different colours, screen frequencies and screen angles are printed on top of each other as disclosed in "The Theory of the Moiré Phenomenon" of Isaac Amidror; Kluwer Academic Publishers, (2000; ISBN 0-7923-5950-X), see Chapter 3 "Moiré minimization". When using a multi-colour press with more than one colour station, it seems that the second spiral in the halftone dots printed by one colour station can also act as an ink channel for the ink which has already been printed by another colour station. As a result, the spreading of the ink laid down on the substrate by the first colour station can be controlled in a better way than with conventional techniques such as AM halftoning, resulting in less moiré.

Figure 37:
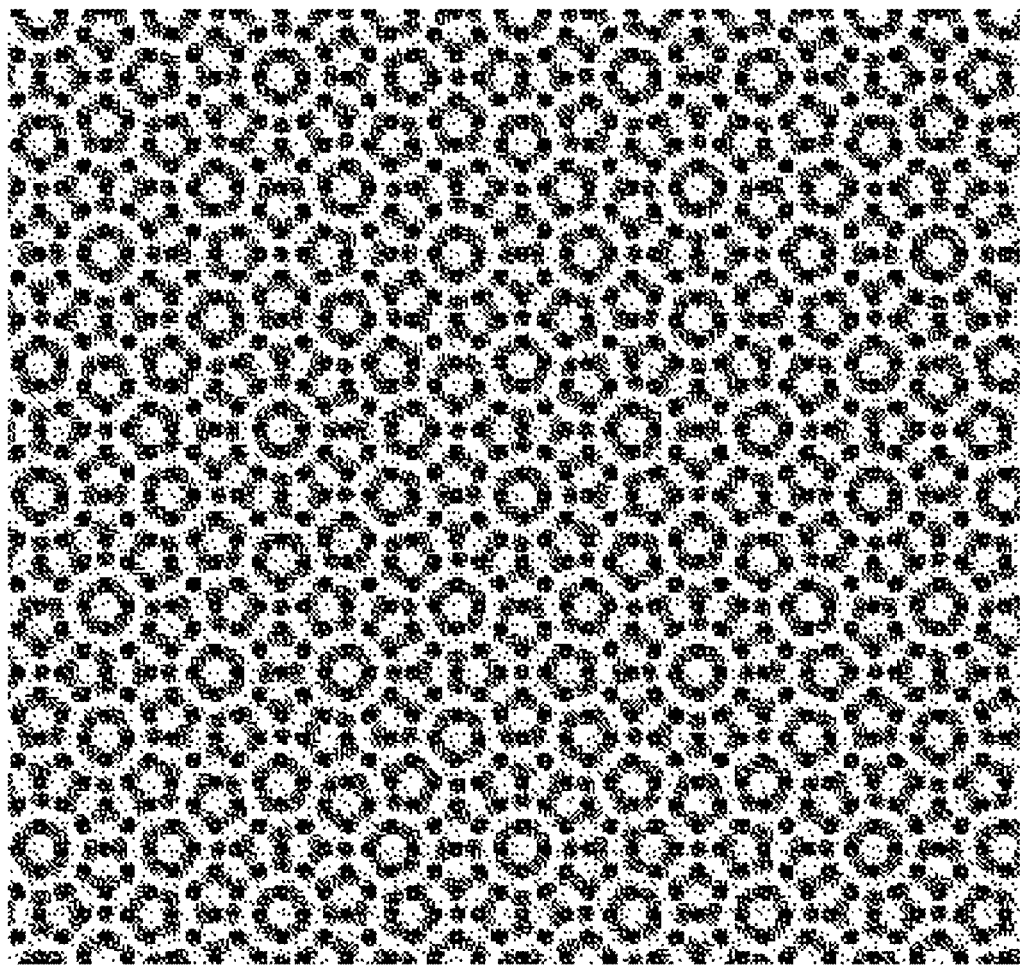
FIG. 37 shows a scanned image of a 4-colour (CMYK) printed copy of a raster image produced by a screening method of the prior art (Agfa's ABS screening) using standard offset angles (0, 15, 45 and 90°) and a screen frequency of 240 LPI. The small speckles between the dots are artefacts resulting from the scan and color conversion.
Figure 38:
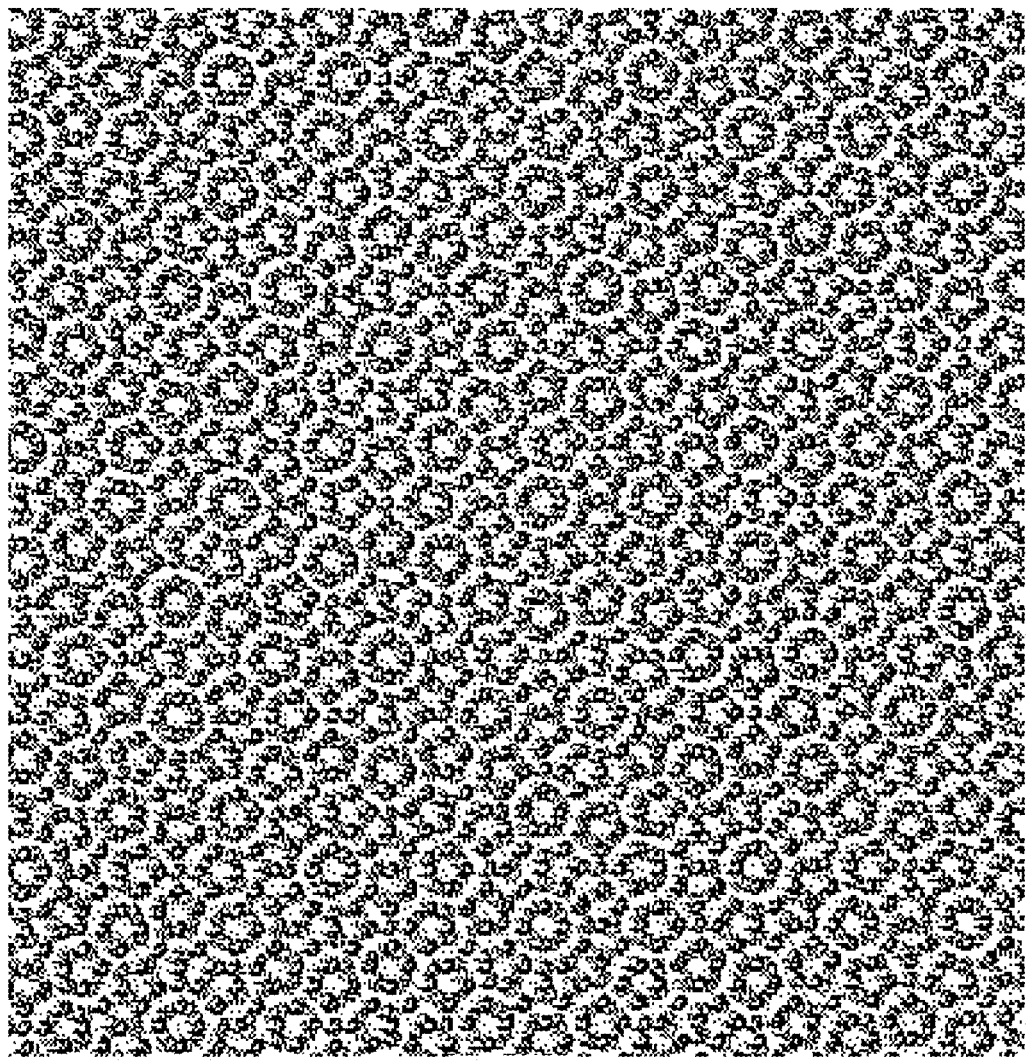
FIG. 38 shows a scanned image of the same print as shown in FIG. 37, but produced by a raster image according to the invention, using the same screening angles, colours and screen frequency as in FIG. 37. The small speckles between the dots are artefacts resulting from the scan and color conversion.

In order to reduce the moiré effect, such as subject moiré, even further it is also preferred to use spiral dots comprising multiple windings of a thin first spiral rather than dots which produce the same coverage with less but thicker windings. Multiple windings render the moiré effect less visible because such dots give the impression of a higher screen frequency. The moiré effect produced by conventional screens results in typical rosette structures as shown in FIG. 37, which are less pronounced when using a raster image according to the invention (FIG. 38).

The present invention is also less subject to a tone jump at the mid-tones, which may occur in conventional AM screens. When the edges of growing halftone dots of the present invention touch, the sudden tone jump, also called density jump, which is known in the prior art, can be reduced because the accumulation of ink induced by the touching dots is drained by the ink channels in the dots.

The spreading of the ink further enables faster drying of the printed copies. This allows to align press work with a proof, since they are both dry one doesn't have to account for dryback. Faster drying also reduces the risk of ink setoff, i.e. the transfer of ink from one printed copy to the back side of another copy lying on top of it, for example in the press delivery tray. The invention is therefore also very well suited for use with a perfecting press, which allows the simultaneous printing on both sides of a substrate in one pass through the press. Faster drying is also beneficial for printing on uncoated foils or plastics, and in newspaper printing. Faster printing speeds can be achieved and printed jobs can be brought faster to a bindery. In offset printing with heatset ink, the temperature of the drying ovens can be lowered, thereby saving energy costs. Likewise, offset printing with curable ink becomes possible with less energy consumption by the curing unit, (UV LEDs, UV bulb or electron beam). The faster drying enabled by the present invention may also provide better ink trapping so that ink trap mottle is reduced.

Inkjet printing also benefits from advantages of the present invention. Especially when the surface tension of the substrate causes dewetting, the raster image of the present invention gives a better print quality, such as uniform solid patches, compared to conventional AM screens, because the ink channel prevents local accumulation of ink on the substrate. The present invention enables inkjet printing at a high screen frequency, e.g. above 200 LPI (78.7 lines/cm), on a variety of substrates such as coated (plastic) film, translucent (plastic) film and newsprint, which was not achievable by state-of-the-art AM halftoning methods.

The better uniformity of patches, produced by the raster image of the present invention, makes it is easier to measure colour profiles for colour management systems and easier to match colour images, e.g. with online colour monitoring by measuring the printed copies during the press run. As a result, a print job comes faster in colour and less substrate is wasted.

Threshold Tile

The raster image of the present invention is preferably generated by one or more threshold tiles, sometimes called threshold arrays, which transform a continuous-tone image to a halftone raster. Said transformation is also called threshold rendering. The use of threshold tiles is well known in the art. More information about threshold tiles is disclosed in e.g. "Digital Color Halftoning" by Henry R. Kang, chapter 13; published in the SPIE/IEEE Series on Imaging Science and Engineering (11 Nov. 1999; ISBN 0-8194-3318-7); and in "Digital halftoning" by Robert Ulichney, chapter 5 and 6 (publisher MIT Press Cambridge, Mass., USA; 1987; ISBN 0-262-21009-6). A conventional way of generating threshold tiles for AM screens is disclosed in the following patent applications: US5155599, US5903713 and EP0910206. Neighbouring spiral dots may grow in a different way, similar to conventional screens as disclosed in "Recent trends in digital halftoning", Proc. SPIE 2949, Imaging Sciences and Display Technologies, (1997); doi: 10.1117/12.266335. The dot centres of the spiral dots may also be shifted as disclosed in U.S. Pat. No. 6,128,099.

When used for binary digital halftoning, one threshold tile is sufficient to generate the raster image of the present invention. As a result, the number of threshold tiles is preferably the same as the number of colour channels in the continuous-tone image. This provides the advantage that the generation of raster images in accordance with the present invention can easily be integrated in current image processors, prepress workflow systems and raster image processors (RIP's), because there is no need to switch between different threshold tiles as used in hybrid halftoning techniques, which require a larger memory than is necessary for the methods of the present invention.

For multilevel digital halftoning, the threshold tile comprises multiple equally sized arrays, one for each level. The shape of such arrays comprising threshold values can be a square or a rectangle but also Utah-shaped arrays or diamond-shaped arrays are suitable. More information about multilevel halftoning can be found in e.g. US5903713.

Figure 20:
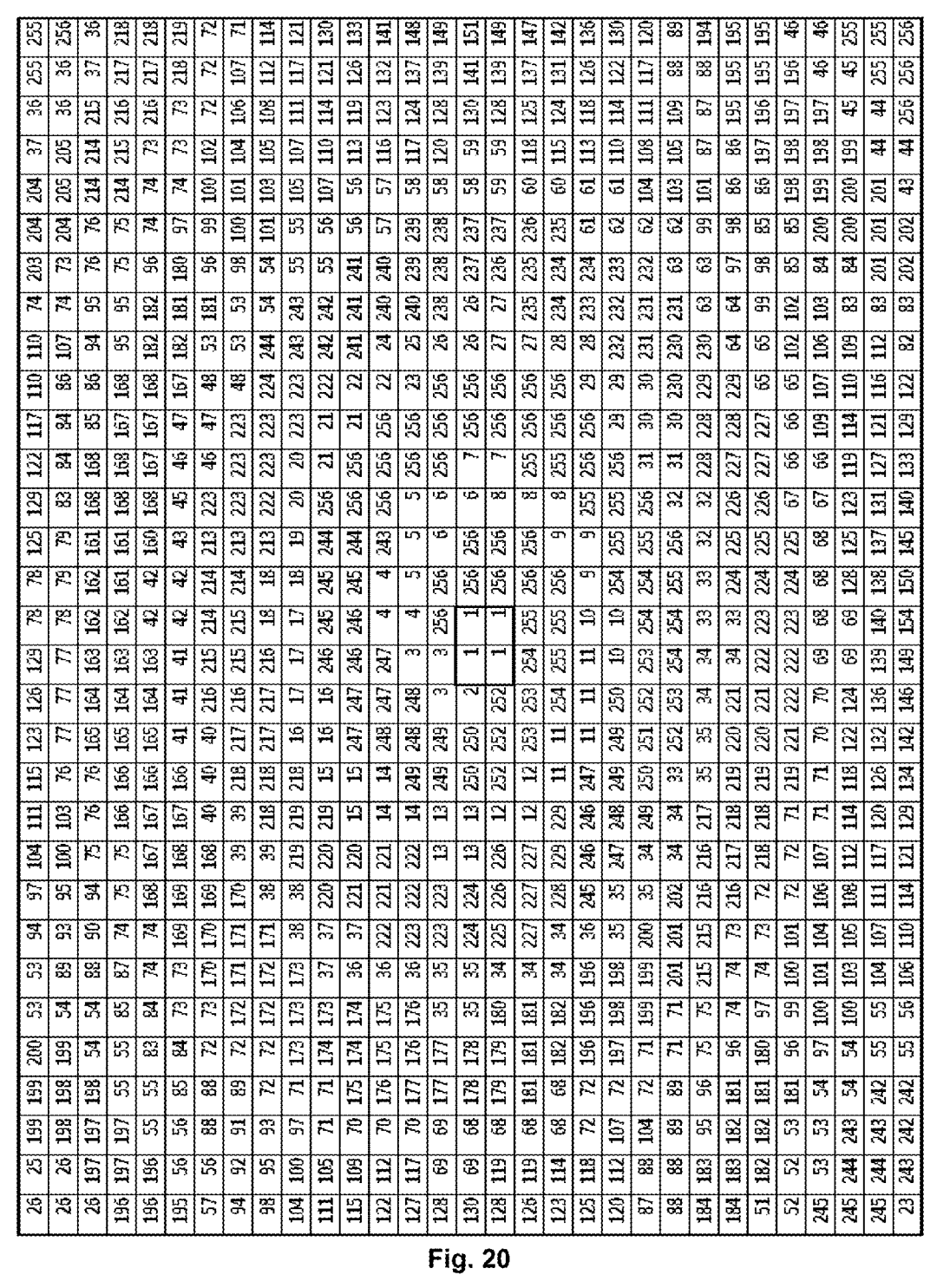
Figure 21:
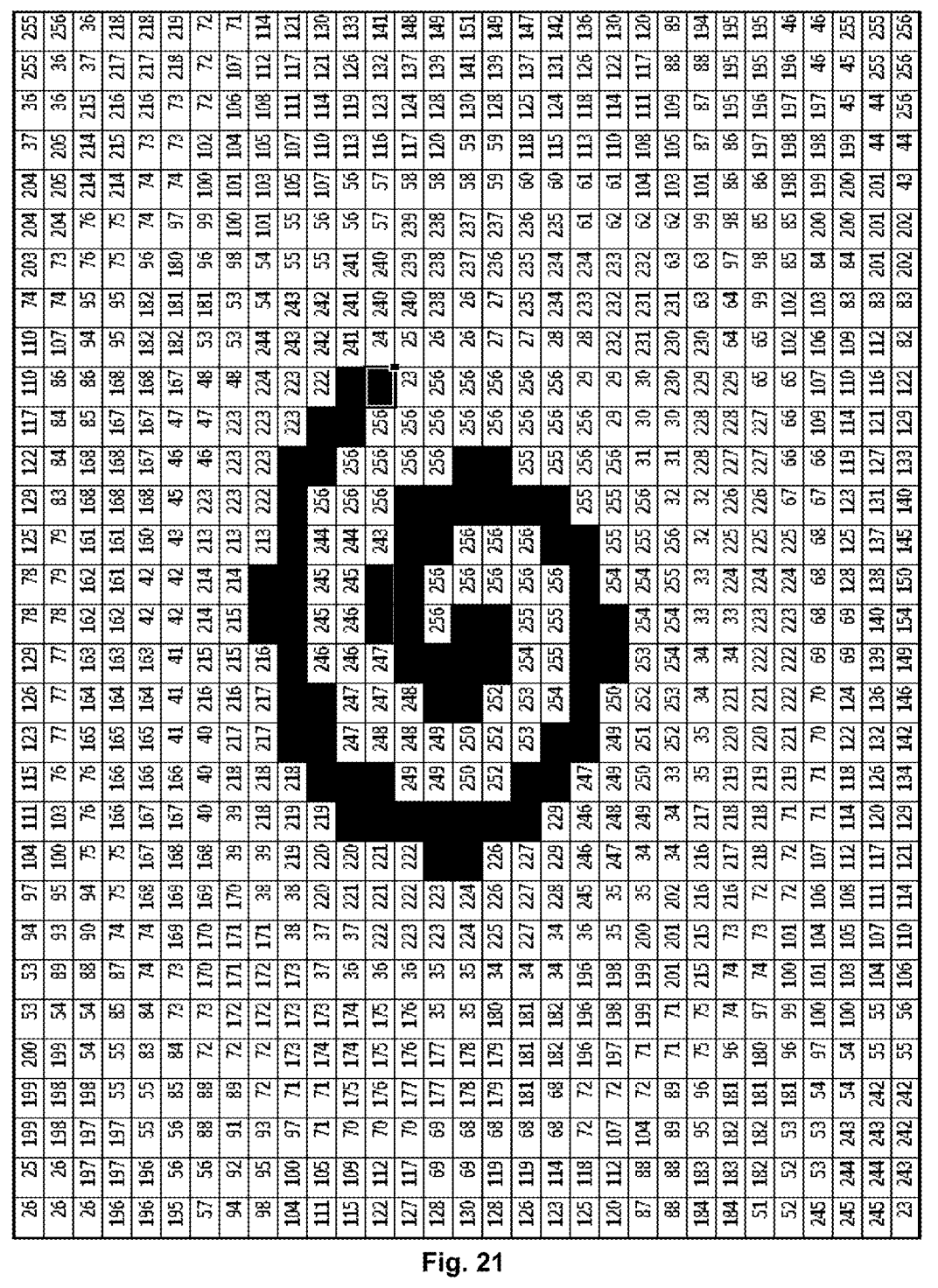

The transformation of a continuous-tone image to the halftone image of the present invention by means of one or more threshold tiles is similar to the prior art: the halftone dot coverage, which is typically expressed as a percentage and is defined by the number of image pixels in the dot, increases, as defined by the threshold tile, proportional to the corresponding density of the original continuous-tone image. The dot coverage of the spiral dots of the present invention can be increased in various ways: by growing the length of the first arc or first spiral and thereby increasing the dot size, as governed by consecutive values of the threshold tile (see FIGS. 20 and 21); by increasing the thickness of the first arc or first spiral without increasing the dot size (thereby shrinking the empty space of the second spiral), either locally e.g. by adding protrusions to the first spiral, by increasing the thickness of one or more segments of the first spiral, and/or by increasing the thickness of the complete first spiral; by inserting image pixels inside the second spiral; or by a combination of any of these methods.

Figure 22:
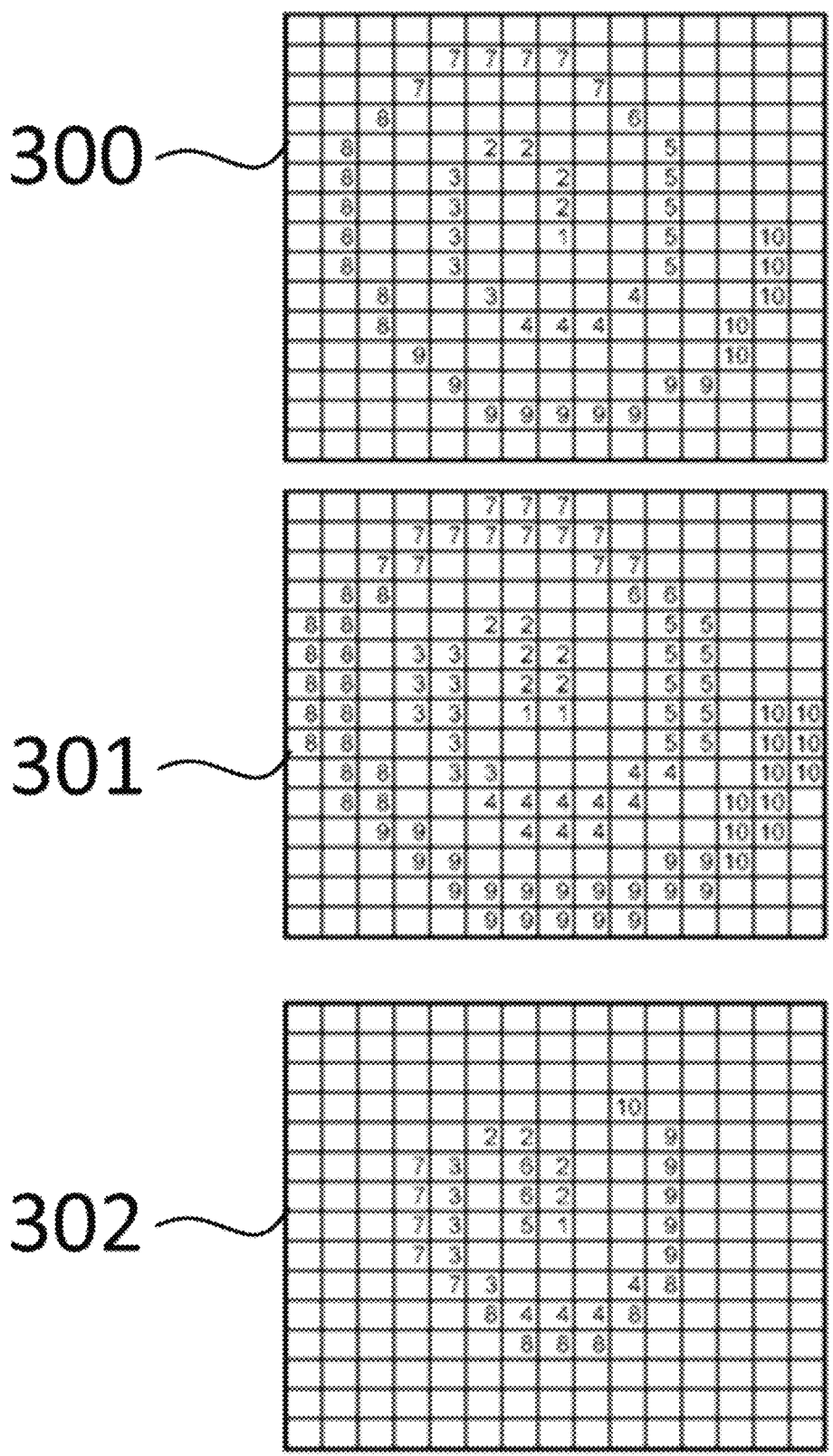
FIGS. 22-24: These figures show examples of threshold tiles (300-306) which are suitable to generate the images of the present invention.
Figure 23:
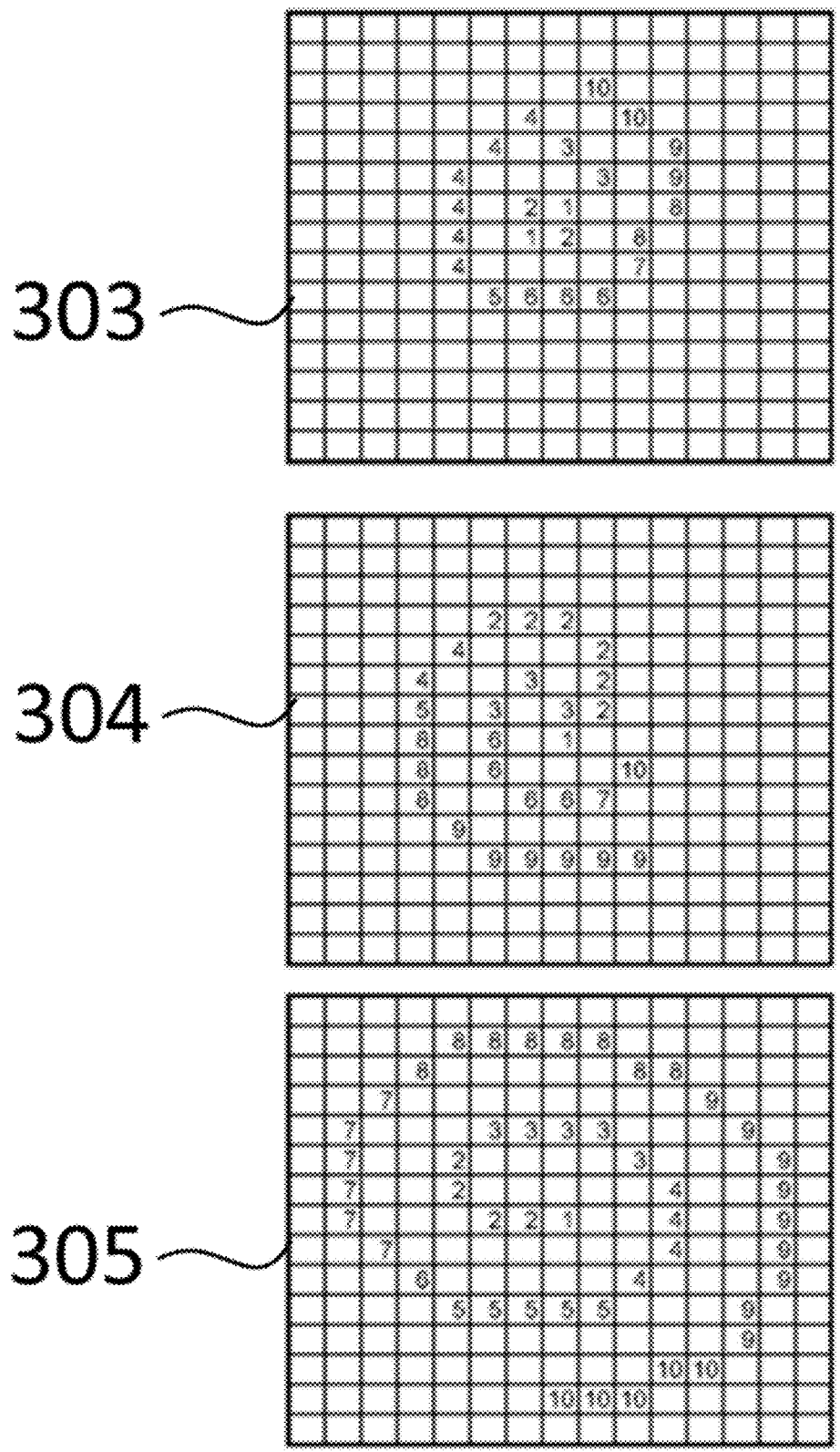
Figure 24:
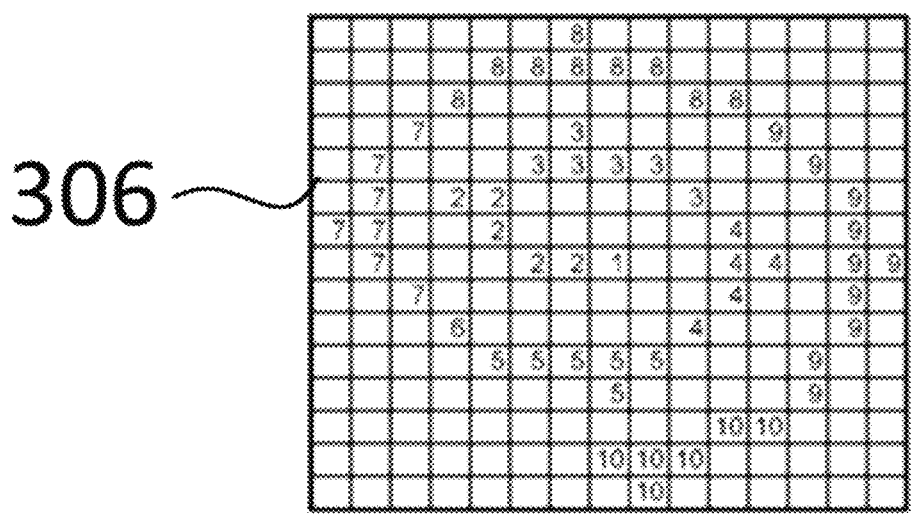
Figure 25:
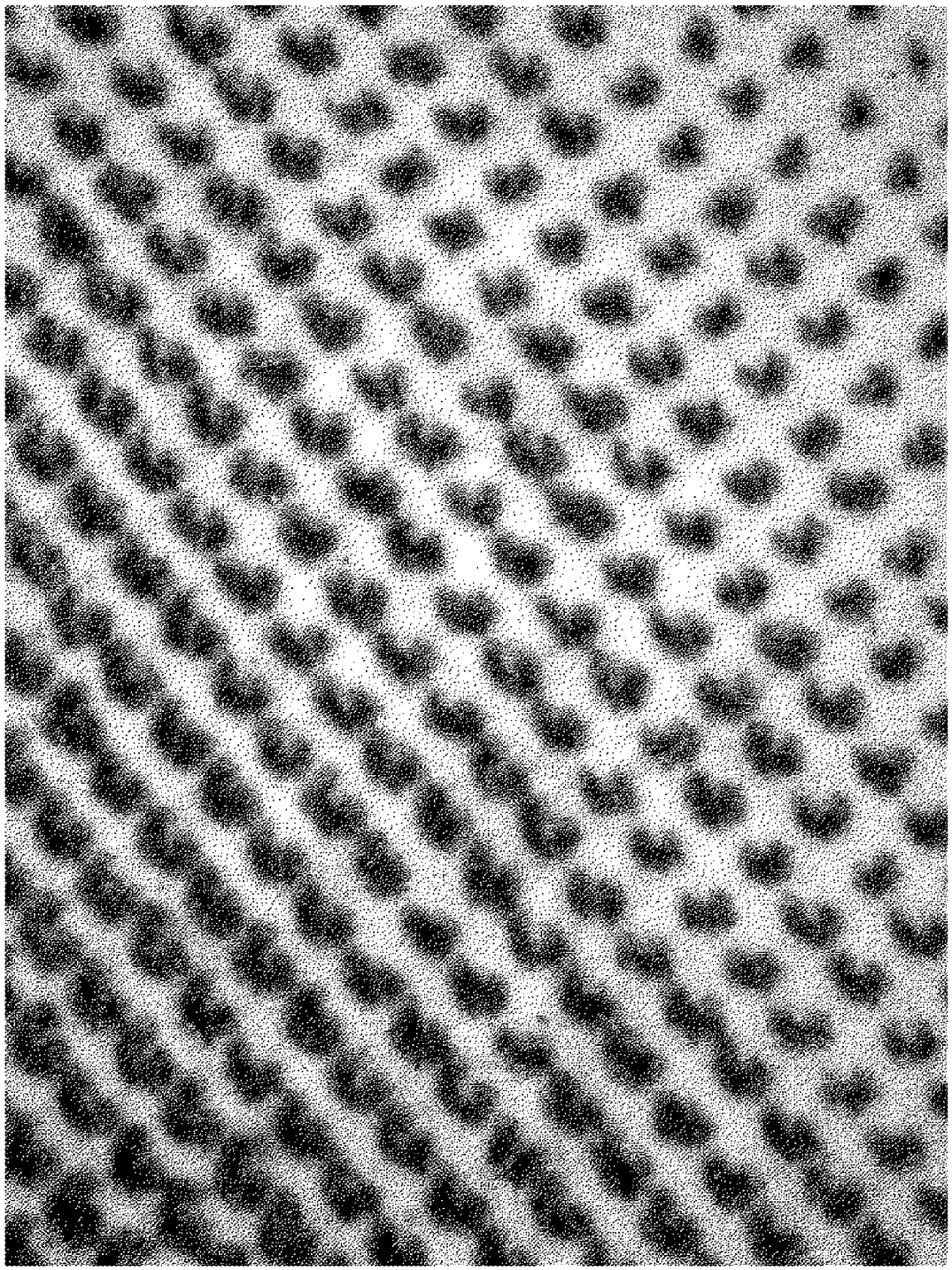
FIG. 25 show a microscopic enlargement of a printed copy produced with a halftone raster image according to the invention (screen frequency 240 LPI; screen angle 45°), which was printed on coated paper (130 gr) with a CMYK Man Roland 300a printing press by means of a lithographic printing plate Elite Pro from Agfa NV. The small speckles between the spiral dots are artefacts resulting from the scan that was made of the original picture.

FIG. 22-24 show seven examples of threshold tiles having a dimension of 15×15 and comprising 10 consecutive threshold values numbered from 1 to 10. These threshold tiles are suitable for generating spiral dots according to the present invention, as shown in the FIGS. 26 to 35.

Threshold tile 300 defines a counterclockwise rotating spiral dot, wherein the maximum thickness of the first spiral is one pixel and the maximum thickness of the second spiral is two pixels. The spiral dots 3001-30010 generated by this threshold tile 300 for consecutive density values 1 to 10 are represented in the first row of FIGS. 26 to 35 respectively.

Threshold tile 301 defines a counterclockwise rotating spiral dot, wherein the maximum thickness of the first spiral is two pixels and the maximum thickness of the second spiral is two pixels. At a threshold value above 7, the second spiral becomes thinner. The spiral dots 3011-30110 generated by this threshold tile 301 for consecutive density values 1 to 10 are represented in the second row of FIGS. 26 to 35 respectively.

Threshold tile 302 defines a counterclockwise rotating spiral dot, wherein the first spiral grows thinner and the second spiral thicker at increasing threshold values. The spiral dots 3021-30210 generated by this threshold tile 302 for consecutive density values 1 to 10 are represented in the third row of FIGS. 26 to 35 respectively.

Threshold tile 303 defines a counterclockwise rotating spiral dot which comprises a square dot at its centre from which a first and second spiral grow in length at higher threshold values. The spiral dots 3031-30310 generated by this threshold tile 303 for consecutive density values 1 to 10 are represented in the fourth row of FIGS. 26 to 35 respectively.

Threshold tile 304 defines a counterclockwise rotating spiral dot which comprises a double first spiral and thereby also two second spirals. The spiral dots 3041-30410 generated by this threshold tile 304 for consecutive density values 1 to 10 are represented in the fifth row of FIGS. 26 to 35 respectively.

Threshold tile 305 is similar to threshold tile 300 but the spiral dot generated thereby has a different start angle. The spiral dots 3051-30510 generated by this threshold tile 305 for consecutive density values 1 to 10 are represented in the sixth row of FIGS. 26 to 35 respectively.

Threshold tile 306 defines a clockwise rotating spiral dot wherein the first spiral comprises protrusions. The spiral dots 3061-30610 generated by this threshold tile 306 for consecutive density values 1 to 10 are represented in the seventh row of FIGS. 26 to 35 respectively.

Figure 26:
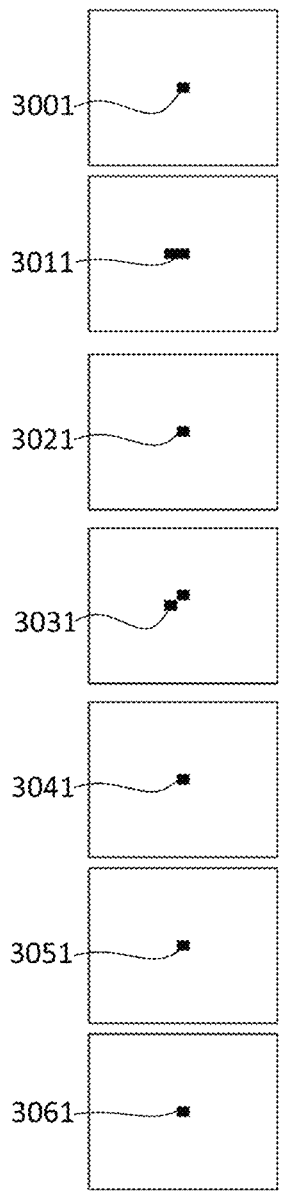
Figure 27:
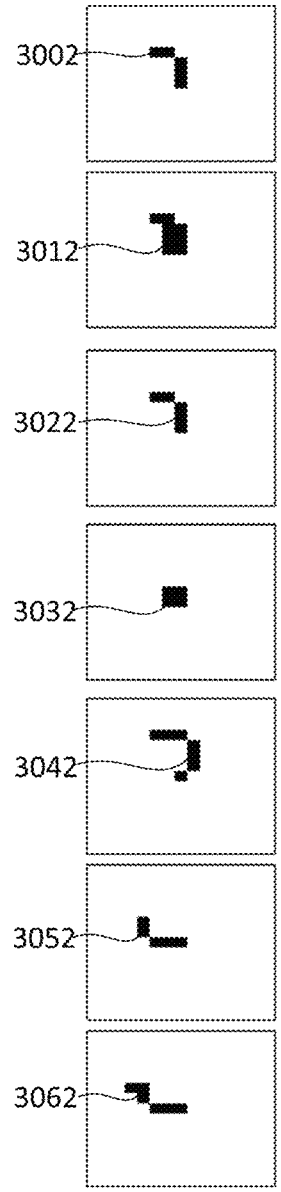
Figure 28:
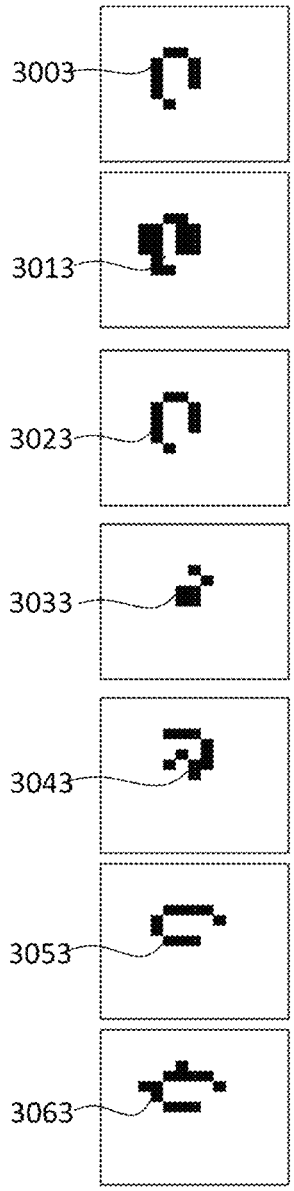

In the highlights of the raster image, the dot coverage may be too low for the image pixels to represent a complete winding of the first spiral. The image pixels then represent a segment of the first spiral, i.e. a first arc as shown in FIGS. 26-28. The transition from highlights to midtones is preferably made by increasing the thickness of said first arc and/or by growing the length of said first arc until a complete winding of the first spiral is formed. Still higher coverage can be obtained by increasing the thickness and/or the length of said first spiral which then may consist of more than one winding, including partial windings.

From a certain threshold coverage, preferably larger than 40%, more preferably larger than 50% and most preferably larger than 55%, the first spiral can no longer grow in length without overlapping with a neighbouring dot. Above said threshold, darker images can be produced by shrinking the length and/or thickness of the second spiral, or by inserting image pixels inside the second spiral. At still higher dot coverages, the second spiral shrinks further and becomes an arc (the second arc).

Due to the overlap between neighbouring dots, spiral dots with a high dot coverage no longer have an open-ended second spiral. Nevertheless, the advantages of the invention are still provided by such spiral dots, because the closed second spiral still defines a channel that can accept ink, so that a better print quality is produced with more uniform patches versus the state-of-the-art AM threshold tiles. The known advantages of state-of-the-art AM threshold tiles versus FM threshold tiles are also provided by the present invention, namely smoothness of flat-tones and rendering of mid-tones and better printing stability. Simultaneously, the present invention also provides the advantages of state-of-the-art FM threshold tiles versus AM threshold tiles, namely rendering of fine details and closing in the shadows. Also no irregular "worms", or spaghetti-like structures are generated by the present invention as in $2^{nd}$ order FM threshold tiles which make the printed images more grainy, especially in vignettes and mid-tones.

In a preferred embodiment, a set of threshold tiles is used to generate the a cross-modulated (XM) raster image according to the present invention, comprising small spiral dots of which the frequency is modulated in the highlight and shadow areas of the image, and larger spiral dots of which the amplitude is modulated in the mid-tones. As a result, screen frequencies above 200 LPI (78.7 lines/cm) are possible. The ratio between resolution and screen frequency of the halftone raster image is preferably below 12, more preferably below 10. For example, when the resolution is 2400 DPI (945 dots/cm), the screen frequency is preferably above 240 LPI (94.5 lines/cm).

The one or more threshold tiles may be generated by a threshold tile generator, also called a halftone generator, which is comprised in a raster image processor or in a prepress workflow system, in accordance with options selected by the user via an input field of a user interface. Conventional options comprise image resolution, screen frequency, screen angle and screen shape. In accordance with the present invention, the number of options is preferably expanded by an input field for selecting the maximum thickness of the first and the second arc or spiral. An extra input field may be added for selecting the shape of the spiral dot (e.g. circular, elliptical, etc., as described above) and preferably also a parameter which further defines the selected shape such as ellipticity. Another input field may be added for the selection of one or more radial lines through the centre of the spiral dots and optionally also an additional input field for the specification of the thickness of the radial lines.

The generator generates the threshold tile from these above-mentioned input fields, preferably by means of a screen function that defines a spiral-shape, such as the Archimedean spiral described above. The spiral shape or radial lines are preferably generated by calculation in polar coordinates contrary to state-of-the-art halftone generators wherein Cartesian coordinates are used.

Applications

The halftone raster image of the present invention can be used in various printing techniques, most preferably lithographic printing, flexographic printing and digital printing.

The raster image can be exposed on a light- or heat-sensitive material such as a lithographic or flexographic printing plate precursor by means of a laser, preferably a violet or an infrared laser. After processing the exposed precursor, which may be hidden to the user in a so-called "development on-press" method, a printing plate carrying the raster image of the present invention is obtained. That plate can then be mounted on a printing press wherein ink is supplied to the plate which is then transferred onto the substrate to be printed.

When used for flexographic printing, the raster image of the present invention is represented on the flexographic plate by spiral dots in relief. Compared to conventional flexography, these halftone dots can be impressed more easily onto the substrate so that a better transfer of ink from the flexographic printing plate to the substrate can be achieved, especially by means of the open-ended ink channel.

It is known that small halftone dots, e.g. when using FM screens, are difficult to reproduce accurately with lithographic printing plates, due to the limited resolution of the image recording layer. Likewise, small printing dots in the lithographic image wear out easily, reducing the run length of the plate. These problems can be reduced by the present invention, which combines aspects of AM screens with the advantages of FM screens, such as rendering fine details and closing in the shadows. The raster image of our invention is therefore advantageously used in combination with lithographic printing plates, in particular lithoplates comprising a photopolymer as image recording layer, which are often used for newspaper printing. Also thermal, i.e. infrared-sensitive, lithographic plates are advantageously used in combination with the present invention.

In a digital printing technique the raster image of the present invention is applied onto the substrate without a plate, e.g. by jetting ink with an inkjet printer. Preferred inkjet inks to be used in the context of this invention are UV-curable inks, (eco-)solvent inks and aqueous inks. All these techniques are well known in the art.

Preferred inkjet printing techniques include wet-on-dry printing and wet-on-wet printing, either by jetting directly on a substrate or by jetting on and transferring from a transfer belt or drum onto a substrate. The predefined ink channel formed by the second spiral provides the mentioned advantages especially when jetting on non-absorbing substrates such as PET, polyethylene or the label substrates which are typically used in flexography. Our invention also allows to use high frequency screening in single pass inkjet systems.

Alternative printing techniques which may benefit from the present invention are screen printing, serigraphy, gravure printing, etching, pad printing, or transfer printing; and digital printing techniques such as xerography, electrophotography, iconography, magnetography, laser printing, dye-sublimation printing, dot-matrix printing, thermal printing, nanography, or thermal (wax) transfer.

The substrate on which the raster image may be printed can be of any kind, e.g. plastic films or foils, release liner, textiles, metal, glass, leather, hide, cotton and of course a variety of paper substrates (lightweight, heavyweight, coated, uncoated, paperboard, cardboard, etc.). The substrate may be a rigid work piece or a flexible sheet, roll or sleeve. Preferred flexible materials include e.g. paper, transparency foils, adhesive PVC sheets, etc., which may have a thickness less than 100 micrometres and preferably less than 50 micrometres. Preferred rigid substrates include e.g. hard board, PVC, carton, wood or ink-receivers, which may have a thickness up to 2 centimetres and more preferably up to 5 centimetres. The substrate may also be a flexible web material (e.g. paper, adhesive vinyl, fabrics, PVC, textile). A receiving layer, for example an ink-receiving layer, may be applied on the substrate for a good adhesion of the reproduced image on the substrate.

In another embodiment, the present invention can also be used in 3D halftoning, such as stereolithography, digital light processing, fused deposition modelling, selective laser sintering, selective laser melting, electronic beam melting and laminated object manufacturing.

EXAMPLES

The following examples (EX1, EX2, EX3, EX4, EX5, EX6) are all printed by a heatset press from Lithoman in CMYK (cyan, magenta, yellow and black) with the following materials and equipment:
ink: Heatset ink system SunOne from SunChemical™ for cyan; magenta; yellow and SunMag from SunChemical™ for black.

substrate: EcoPrime 68H 52 g/m² from UPM platesetter: magnus FLV plate setter from KODAK™ with print resolution of 2400 dpi.

printing plate: ELECTRA MAX Digital Plate from KODAK™ and further use of standard heatset printing consumables as 707 Plate Finisher from KODAK™; SchnellReiniger 220-300 from VEGRA GMBH as blanket washer; Electra Max Plate Replenisher from KODAK™; SalinoFix from Huber Group (which is an additive for targeted adjustment of the total hardness, to make purified water ideally suited to the offset printing process) and Redufix AF from Huber Group as fount solution (which is designed for printing without alcohol on web offset presses with continuous-feed dampening units).

Said examples are using one of the following halftoning method with threshold tiles (one threshold per ink) whereby the screen frequency is 140 LPI (lines per inch); which is 55.12 lines per cm (1 inch=2.54 cm); and the screen angles are for cyan, magenta, yellow and black respectively 15, 75, 0 and 45 degrees at a resolution of 2400 dpi; which is 944.88 dots per cm:

* HT1=Agfa Balanced Screening™; also abbreviated as ABS; from AGFA™ to compare with

* HT2=According to the present invention with spiral shaped halftone dots as shown in FIG. 11 for black separation. The maximum spiral thickness is 2.5×25400/2400=26.4583 μm and the maximum thickness of the open ink channel; also called in the present invention ink channel; is 1.5×25400/2400 μm=15.875 μm.

ABS is a PostScript™-based conventional, halftone screening system that lifts up the quality of prints. Both halftoning methods (HT1, HT2) are using one threshold tile per color so easily implementable in workflow system comprising Postscript (PS)-interpreters and Portable document Format (PDF)-interpreters. The workflow system used in these examples is Apogee™ from AGFA™.

The 6 print jobs from the examples (EX1; EX2; EX3; EX4; EX5; EX6) are week-magazines; printed for retail and food market; comprising new prices of consumer products and temporary promotions on colored solid backgrounds on 48 or 80 A4 pages, with imposition and recto/verso printing in CMYK on both side of the substrate. They are printed once in several copies with HT1 and once in several copies with HT2 at the same maximum density and same density for each tone value for each ink for having a similar printing result per color (cyan, magenta, yellow and black) between the two halftoning methods.

Ink Coverage Calculated from Halftone Digital Raster Image in Apogee

The ink coverage can be calculated in Apogee™ after the halftoning step with the tone curve. In the following table the ink coverage in percentage (max=[number of inks]×100%) is calculated according said calculation method in Apogee™. The difference in ink coverage per example (e.g. EX1 vs EX2) is caused by other temporary (weekly) promotions and/or different layouting. The difference in ink coverage in each example between the halftoning methods HT1 and HT2 is caused by the use of a different tone value curve, also called linearization curve, so the densities for each ink are equal on print between the two halftoning methods (HT1, HT2).

| Example | Halftoning | Ink coverage Recto | Verso |
|---|---|---|---|
| EX1 | HT1 | 131.2 | 127.3 |
| EX1 | HT2 | 126.3 | 122.7 |
| EX2 | HT1 | 112.5 | 106.6 |
| EX2 | HT2 | 108.8 | 103.0 |
| EX3 | HT1 | 83.2 | 88.3 |
| EX3 | HT2 | 72.8 | 77.5 |
| EX4 | HT1 | 134.8 | 139.5 |
| EX4 | HT2 | 130.7 | 135.4 |
| EX5 | HT1 | 94.9 | 100.3 |
| EX5 | HT2 | 81.8 | 86.9 |
| EX6 | HT1 | 136.9 | 143.5 |
| EX6 | HT2 | 132.4 | 138.8 |

Although the calculated ink-coverage is a prognosis, it gives already an idea how high the ink coverages are in said examples.

Example 1 (EX1)

The following maximum densities are measured in copies:

| Black | 1.15; | Cyan | 0.96 |
|---|---|---|---|
| Magenta | 0.97; | Yellow | 0.90 |

The number of copies is 250000 per halftoning method; Amount of used ink in kilogram (kg) per halftoning method:

| HT1 | 610 (black = 36%; cyan = 17%; magenta = 18%; yellow = 29%) |
|---|---|
| HT2 | 532 (black = 35%; cyan = 17%; magenta = 18%; yellow = 30%) |

Example 2 (EX2)

The following maximum densities are measured in copies:

| Black | 1.15; | Cyan | 0.96 |
|---|---|---|---|
| Magenta | 0.97; | Yellow | 0.90 |

The number of copies is 275000 per halftoning method; Amount of used ink in kilogram (kg) per halftoning method:

| HT1 | 641 (black = 36%; cyan = 21%; magenta = 19%; yellow = 27%) |
|---|---|
| HT2 | 581 (black = 33%; cyan = 21%; magenta = 20%; yellow = 26%) |

Example 3 (EX3)

The following maximum densities are measured in copies:

| Black | 1.3; | Cyan | 1.15 |
|---|---|---|---|
| Magenta | 1.15; | Yellow | 1.10 |

The number of copies is 325000 per halftoning method;
Amount of used ink in kilogram (kg) per halftoning method:

| | |
|---|---|
| HT1 | 792 (black = 39%; cyan = 21%; magenta = 18%; yellow = 22%) |
| HT2 | 604 (black = 38%; cyan = 21%; magenta = 19%; yellow = 22%) |

Note: For unknown reasons the maximum densities between prints with HT1 and HT2 were not equal and had to be adapted during the print run of EX3+HT2.

Example 4 (EX4)

The following maximum densities are measured in copies:

| | | | |
|---|---|---|---|
| Black | 1.15; | Cyan | 0.96 |
| Magenta | 0.97; | Yellow | 0.90 |

The number of copies is 250000 per halftoning method;
Amount of used ink in kilogram (kg) per halftoning method:

| | |
|---|---|
| HT1 | 703 (black = 22%; cyan = 10%; magenta = 23%; yellow = 45%) |
| HT2 | 607 (black = 23%; cyan = 10%; magenta = 23%; yellow = 44%) |

Example 5 (EX5)

The following maximum densities are measured in copies:

| | | | |
|---|---|---|---|
| Black | 1.30; | Cyan | 1.15 |
| Magenta | 1.15; | Yellow | 1.10 |

The number of copies is 325000 per halftoning method;
Amount of used ink in kilogram (kg) per halftoning method:

| | |
|---|---|
| HT1 | 732 (black = 45%; cyan = 20%; magenta = 18%; yellow = 17%) |
| HT2 | 625 (black = 44%; cyan = 20%; magenta = 20%; yellow = 16%) |

Example 6 (EX6)

The following maximum densities are measured in copies:

| | | | |
|---|---|---|---|
| Black | 1.15; | Cyan | 0.96 |
| Magenta | 0.97; | Yellow | 0.90 |

The number of copies is 375000 per halftoning method;
Amount of used ink in kilogram (kg) per halftoning method:

| | |
|---|---|
| HT1 | 656 (black = 36%; cyan = 22%; magenta = 19%; yellow = 23%) |
| HT2 | 539 (black = 35%; cyan = 23%; magenta = 20%; yellow = 22%) |

CONCLUSION

The total weight of used ink versus number of copies between the HT1 printed copies and the HT2 printed copies is compared to calculate the ink saving when using HT2. These examples shows that using HT2 uses less ink. Lower ink in a copy provides better water/ink balance, resulting in higher speed and there is the possibility to lower the temperature in the heatset oven.

The invention claimed is:

1. A method of transforming a continuous-tone image to the halftone raster image comprising:
   a plurality of halftone dots including:
      image pixels defining a first arc or a plurality of first arcs that together define a first spiral; and
      non-image pixels defining a second arc or a plurality of second arcs that together define a second spiral,
   wherein the halftone raster image creates an illusion of a continuous-tone image on a printed copy, the plurality of halftone dots are regularly tiled at a distance between centers of neighboring halftone dots from 50 µm to 400 µm, and
      the first arc, the first spiral, the second arc, and the second spiral each have a length and/or thickness which is determined by local densities of the continuous-tone image, the method comprising:
      transforming the continuous-tone image to the halftone raster image using at least one threshold tile such that:
         in highlights and midtones of the halftone raster image, a number of image pixels increases as a result of increasing the length and/or thickness of the first arc or the first spiral; and
         in shadows of the halftone raster image, a number of image pixels increases as a result of decreasing the length and/or thickness of the second arc or the second spiral.

2. The method of claim 1, wherein the number of image pixels increases as a result of: adding protrusions to the first spiral, increasing the thickness of one or more segments of the first spiral, increasing the thickness of the first spiral, by inserting image pixels inside the second spiral, or a combination of any of the above.

3. A method of making a printing plate comprising:
   transforming a continuous-tone image to a halftone raster image by the method of claim 2; and
   exposing the halftone raster image onto a printing plate precursor.

4. The method of claim 2, wherein the transforming of the continuous-tone image to the halftone raster image uses a single threshold tile.

5. The method of claim 4, wherein a thickness of each of the first arc, the second arc, the first spiral, and the second spiral is from 1 µm to 75 µm.

6. The method of claim 5, wherein the halftone raster image has a screen frequency higher than 39 lines per cm and a screen angle selected from the group consisting of 0°, 15°, 75°, 90°, 45°, 67.5°, 22.5°, 7.5°, 82.5°, and 37.5°.

7. The method of claim 2, wherein a thickness of each of the first arc, the second arc, the first spiral, and the second spiral is from 1 µm to 75 µm.

8. The method of claim 7, wherein the halftone raster image has a screen frequency higher than 39 lines per cm and a screen angle selected from the group consisting of 0°, 15°, 75°, 90°, 45°, 67.5°, 22.5°, 7.5°, 82.5°, and 37.5°.

9. The method of claim 2, wherein the halftone raster image has a screen frequency higher than 39 lines per cm and a screen angle selected from the group consisting of 0°, 15°, 75°, 90°, 45°, 67.5°, 22.5°, 7.5°, 82.5°, and 37.5°.

10. The method of claim 1, wherein the second arc or the second spiral is open-ended.

11. The method of claim 10, wherein the number of image pixels increases as a result of: adding protrusions to the first spiral, increasing the thickness of one or more segments of the first spiral, increasing the thickness of the first spiral, by inserting image pixels inside the second spiral, or a combination of any of the above.

12. A method of making a printing plate comprising:
transforming a continuous-tone image to a halftone raster image by the method of claim 11; and
exposing the halftone raster image onto a printing plate precursor.

13. The method of claim 11, wherein the transforming of the continuous-tone image to the halftone raster image uses a single threshold tile.

14. The method of claim 13, wherein a thickness of each of the first arc, the second arc, the first spiral, and the second spiral is from 1 μm to 75 μm.

15. The method of claim 14, wherein the halftone raster image has a screen frequency higher than 39 lines per cm and a screen angle selected from the group consisting of 0°, 15°, 75°, 90°, 45°, 67.5°, 22.5°, 7.5°, 82.5°, and 37.5°.

16. The method of claim 11, wherein a thickness of each of the first arc, the second arc, the first spiral, and the second spiral is from 1 μm to 75 μm.

17. The method of claim 16, wherein the halftone raster image has a screen frequency higher than 39 lines per cm and a screen angle selected from the group consisting of 0°, 15°, 75°, 90°, 45°, 67.5°, 22.5°, 7.5°, 82.5°, and 37.5°.

18. The method of claim 11, wherein the halftone raster image has a screen frequency higher than 39 lines per cm and a screen angle selected from the group consisting of 0°, 15°, 75°, 90°, 45°, 67.5°, 22.5°, 7.5°, 82.5°, and 37.5°.

19. A method of making a printing plate comprising:
transforming a continuous-tone image to a halftone raster image by the method of claim 10; and
exposing the halftone raster image onto a printing plate precursor.

20. A method of inkjet printing comprising:
transforming a continuous-tone image to a halftone raster image by the method of claim 10; and
jetting ink onto a substrate at areas defined by the first arc and the first spiral of the halftone raster image.

21. The method of claim 10, wherein the transforming of the continuous-tone image to the halftone raster image uses a single threshold tile.

22. The method of claim 21, wherein a thickness of each of the first arc, the second arc, the first spiral, and the second spiral is from 1 μm to 75 μm.

23. The method of claim 22, wherein the halftone raster image has a screen frequency higher than 39 lines per cm and a screen angle selected from the group consisting of 0°, 15°, 75°, 90°, 45°, 67.5°, 22.5°, 7.5°, 82.5°, and 37.5°.

24. The method of claim 10, wherein a thickness of each of the first arc, the second arc, the first spiral, and the second spiral is from 1 μm to 75 μm.

25. The method of claim 24, wherein the halftone raster image has a screen frequency higher than 39 lines per cm and a screen angle selected from the group consisting of 0°, 15°, 75°, 90°, 45°, 67.5°, 22.5°, 7.5°, 82.5°, and 37.5°.

26. The method of claim 10, wherein the halftone raster image has a screen frequency higher than 39 lines per cm and a screen angle selected from the group consisting of 0°, 15°, 75°, 90°, 45°, 67.5°, 22.5°, 7.5°, 82.5°, and 37.5°.

27. A method of making a printing plate comprising:
transforming a continuous-tone image to a halftone raster image by the method of claim 1; and
exposing the halftone raster image onto a printing plate precursor.

28. A method of inkjet printing comprising:
transforming a continuous-tone image to a halftone raster image by the method of claim 1; and
jetting ink onto a substrate at areas defined by the first arc and the first spiral of the halftone raster image.

29. The method of claim 1, wherein the transforming of the continuous-tone image to the halftone raster image uses a single threshold tile.

30. The method of claim 29, wherein a thickness of each of the first arc, the second arc, the first spiral, and the second spiral is from 1 μm to 75 μm.

31. The method of claim 30, wherein the halftone raster image has a screen frequency higher than 39 lines per cm and a screen angle selected from the group consisting of 0°, 15°, 75°, 90°, 45°, 67.5°, 22.5°, 7.5°, 82.5°, and 37.5°.

32. The method of claim 1, wherein a thickness of each of the first arc, the second arc, the first spiral, and the second spiral is from 1 μm to 75 μm.

33. The method of claim 32, wherein the halftone raster image has a screen frequency higher than 39 lines per cm and a screen angle selected from the group consisting of 0°, 15°, 75°, 90°, 45°, 67.5°, 22.5°, 7.5°, 82.5°, and 37.5°.

34. The method of claim 1, wherein the halftone raster image has a screen frequency higher than 39 lines per cm and a screen angle selected from the group consisting of 0°, 15°, 75°, 90°, 45°, 67.5°, 22.5°, 7.5°, 82.5°, and 37.5°.

* * * * *